(12) United States Patent
Tanaka et al.

(10) Patent No.: US 8,107,529 B2
(45) Date of Patent: Jan. 31, 2012

(54) CODING DEVICE, CODING METHOD, PROGRAM OF CODING METHOD, AND RECORDING MEDIUM RECORDED WITH PROGRAM OF CODING METHOD

(75) Inventors: Junichi Tanaka, Kanagawa (JP); Kazushi Sato, Kanagawa (JP); Yoichi Yagasaki, Tokyo (JP)

(73) Assignee: Sony Corporation (JP)

( * ) Notice: Subject to any disclaimer, the term of this patent is extended or adjusted under 35 U.S.C. 154(b) by 1482 days.

(21) Appl. No.: 11/515,590

(22) Filed: Sep. 5, 2006

(65) Prior Publication Data
US 2007/0147498 A1 Jun. 28, 2007

(30) Foreign Application Priority Data
Sep. 5, 2005 (JP) ............................... P2005-255855

(51) Int. Cl.
*H04N 7/12* (2006.01)
(52) U.S. Cl. .................. 375/240.06; 348/406.1
(58) Field of Classification Search ............... 348/384.1, 348/394.1, 395.1, 400.1, 401.1, 402.1, 403.1, 348/404.1, 407.1, 408.1, 409.1, 410, 411, 348/412, 413, 414, 415, 416.1, 420.1, 421.1, 348/425.1, 430, 406.1; 382/236, 238, 240, 382/242, 248, 250, 251, 222.1; 375/240, 375/240.03, 240.16, 240.2, 240.24, 240.23, 375/240.05, 240.12
See application file for complete search history.

(56) References Cited

U.S. PATENT DOCUMENTS

| | | | |
|---|---|---|---|
| 2003/0152279 A1* | 8/2003 | Ohtani et al. | 382/236 |
| 2005/0156762 A1* | 7/2005 | Tsuru | 341/107 |
| 2007/0297507 A1* | 12/2007 | Kim | 375/240.03 |
| 2010/0208799 A1* | 8/2010 | Park et al. | 375/240.08 |

FOREIGN PATENT DOCUMENTS

| | | | |
|---|---|---|---|
| JP | 06311506 A | 11/1994 | |
| JP | 2000138938 A | 5/2000 | |
| JP | 2001169283 A | 6/2001 | |
| JP | 2003-061096 A | 2/2003 | |
| JP | 2003-061097 A | 2/2003 | |
| JP | 2005080151 A | 3/2005 | |
| JP | 2005217499 A | 8/2005 | |

OTHER PUBLICATIONS

Office Action from Japanese Application No. 2005-255855, dated Jun. 22, 2010.

* cited by examiner

*Primary Examiner* — Behrooz Senfi
(74) *Attorney, Agent, or Firm* — Lerner, David, Littenberg, Krumholz & Mentlik, LLP

(57) ABSTRACT

A coding device makes a GOP setting to input image data, and applies a coding process to the input image data on a macroblock basis successively by intra and inter prediction to output coded data. The device includes an orthogonal transform section; a quantization section; a coding section; and a rate control section. The rate control section includes an activity detection section; and a prediction residual detection section. The rate control section calculates, in pictures configuring a GOP, a target code amount of any picture that has not yet been subjected to the coding process, another target code amount for a macroblock of any of the pictures relating to the coding process from the target code amount of the picture not yet subjected to the coding process, and the quantization scale of the quantization section in which a generated code amount serves as the target code amount.

9 Claims, 16 Drawing Sheets

FIG. 8
(RELATED ART)

| Intra4x4LumaPredMode [ 4x4LumaBlkIdx ] | Name of Intra4x4LumaPredMode [ 4x4LumaBlkIdx ] |
|---|---|
| 0 | Intra_4x4_Vertical (prediction mode) |
| 1 | Intra_4x4_Horizontal (prediction mode) |
| 2 | Intra_4x4_DC (prediction mode) |
| 3 | Intra_4x4_Diagonal_Down_Left (prediction mode) |
| 4 | Intra_4x4_Diagonal_Down_Right (prediction mode) |
| 5 | Intra_4x4_Vertical_Right (prediction mode) |
| 6 | Intra_4x4_Horizontal_Down (prediction mode) |
| 7 | Intra_4x4_Vertical_Left (prediction mode) |
| 8 | Intra_4x4_Horizontal_Up (prediction mode) |

| Intra_16x16_pred_mode | Name of Intra_16x16_pred_mode |
|---|---|
| 0 | Intra_16x16_Vertical (prediction mode) |
| 1 | Intra_16x16_Horizontal (prediction mode) |
| 2 | Intra_16x16_DC (prediction mode) |
| 3 | Intra_16x16_Plane (prediction mode) |

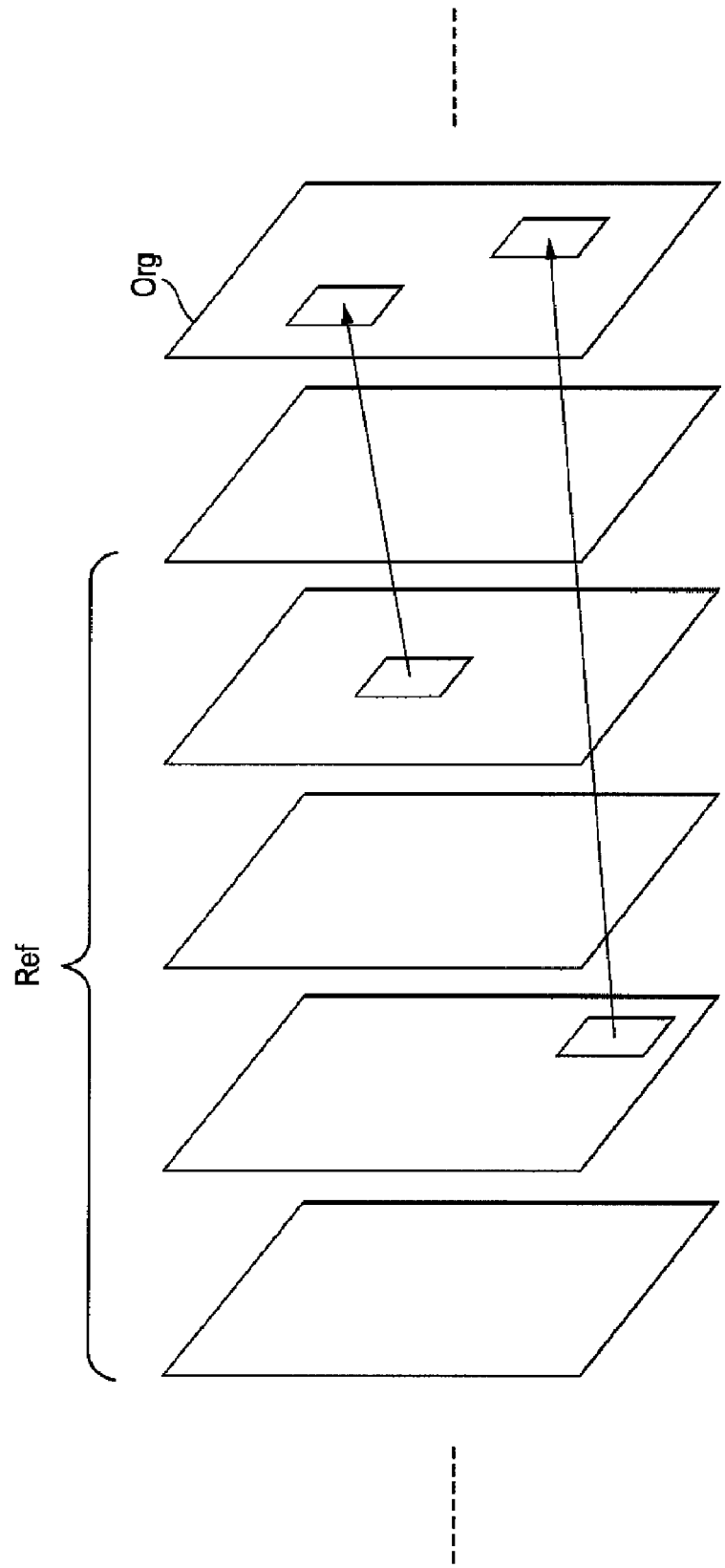

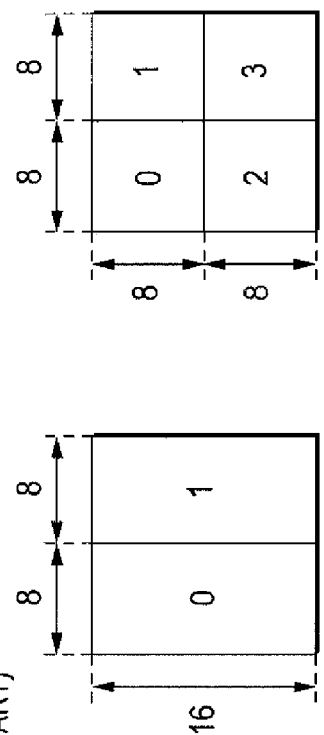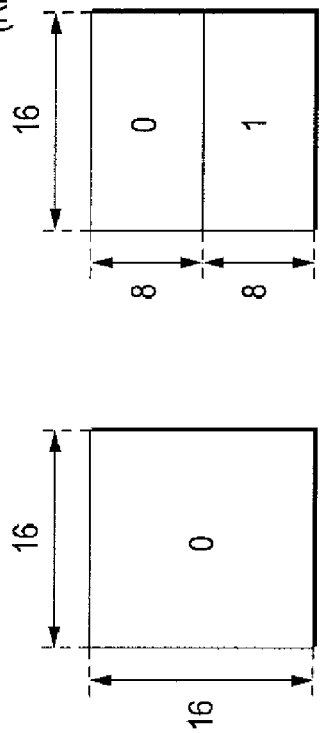
FIG. 14
(RELATED ART)

FIG. 15
(RELATED ART)

| | | A | aa | B | | |
|---|---|---|---|---|---|---|
| | | C | bb | D | | |
| E | F | G a b c H | | | I | J |
| cc | dd | d e f g | | | ee | ff |
| | | h i j k m | | | | |
| | | n p q r | | | | |
| K | L | M s N | | | P | Q |
| | | R | gg | S | | |
| | | T | hh | U | | |

…

CODING DEVICE, CODING METHOD, PROGRAM OF CODING METHOD, AND RECORDING MEDIUM RECORDED WITH PROGRAM OF CODING METHOD

CROSS-REFERENCE TO RELATED APPLICATIONS

The present application claims priority from Japanese Patent Application No. JP 2005-255855 filed on Sep. 5, 2005, the disclosure of which is hereby incorporated by reference herein.

BACKGROUND OF THE INVENTION

The present invention relates to a coding device, a coding method, a program of the coding method, and a recording medium recorded with the program of the coding method, which are all applicable to cases of transmitting or recording image data compressed by orthogonal transform and motion compensation, for example. The invention aims to improve, with consideration given to visual characteristics, the image quality much better than a previous technique by correcting a quantization scale of every macroblock based on an activity and a prediction residual in such a manner as to improve the image quality utilizing the visual characteristics.

For transmission and recording of moving images in broadcast stations and general households, recently popular devices are those efficiently transmitting and storing image data by effectively utilizing redundancy of the image data. Such devices are configured to compress the image data by orthogonal transform, e.g., discrete cosine transform, and motion compensation with an MPEG (Moving Picture Experts Group) compliant scheme, for example.

Such an MPEG compliant scheme includes MPEG2 (ISO/IEC 13818-2), which is defined as being a general-purpose image coding scheme. As is defined to be ready for both interlaced scanning and progressive scanning or standard-resolution images and high-definition images, MPEG2 is currently popular for a wide range of professional and consumer uses. Specifically, MPEG2 promises high compression rates with high image quality by compressing standard-resolution image data, e.g., 720×480 pixels, of interfaced scanning scheme to bit rates of 4 to 8 [Mbps], or by compressing high-resolution image data, e.g., 1920×1088 pixels, of interfaced scanning scheme to bit rates of 18 to 22 [Mbps].

MPEG2, however, is a high-image-quality coding scheme suitable for broadcast use but not for an enhanced-compression coding scheme with which the code amount is less than that of MPEG1. With the recent widespread use of portable terminals, the needs for such an enhanced-compression coding scheme with the less code amount than that of MPEG1 are expected to be increased. To deal with such needs, an MPEG4 coding scheme is certified as international standards by ISO/IEC (International Organization for Standardization/international Electrotechnical Commission) 14496-2 on December 1998.

For such a coding scheme, standardization is promoted for H26L (ITU-T Q6/16 VCEG) that is originally developed for image coding for videoconference. Although H26L requires a large amount of computation compared with MPEG2 and MPEG4, but promises a high coding efficiency compared with MPEG2 and MPEG4. As a part of activities relating to MPEG4, standardization of another coding scheme is promoted as Joint Model of Enhanced-Compression Video Coding, and is certified as international standards in March 2003 under the name of H264 and MPEG4 Part10 (AVC: Advanced Video Coding). For the scheme, H26L is used as a basis to establish various functions, and the scheme promises the much higher coding efficiency.

FIG. 4 is a block diagram showing a coding device based on the AVC. This coding device 1 subjects image data to a coding process by intra coding and inter coding. That is, the coding device 1 selects any optimum prediction mode from a plurality of intra prediction modes and a plurality of inter prediction modes. A prediction value of the selected prediction mode is then subtracted from image data so that differential data, i.e., prediction error data, is generated. The resulting differential data is subjected to orthogonal transform, quantization, and variable-length coding so that the image data is coded by intra coding and inter coding.

That is, in this coding device 1, an analog/digital conversion circuit (A/D) 2 subjects a video signal S1 to A/D conversion, and outputs image data D1. An image sorting buffer 3 receives the image data D1 provided by the A/D 2, applies frame sorting to the image data D1, and outputs the sorting result. Such frame sorting is applied based on the GOP (Group of Pictures) structure relating to a coding process in the coding device 1.

A subtracter 4 receives the image data D1 provided by the image sorting buffer 3, and with intra coding, generates and outputs differential data D2. The differential data D2 is of a difference between the image data D1 and a prediction value generated by an intra prediction circuit 5. With the inter coding, the subtracter 4 generates and outputs another differential data D2, which is a difference between the image data D1 and a prediction value generated by a motion prediction/compensation circuit 6. An orthogonal transform circuit 7 receives the output data D2 of the subtracter 4, and outputs transform coefficient data D3 being a process result of orthogonal transform, e.g., discrete cosine transform or Karhunen-Loeve transform.

A quantization circuit 8 quantizes the transform coefficient data D3, and outputs the quantization result. For such quantization, used is a quantization scale under the rate control of a rate control circuit 9. A reverse coding device 10 applies reverse coding, e.g., variable-length coding, arithmetic coding, or others to the data provided by the quantization circuit 8, and outputs the result. The reverse coding device 10 acquires information from the intra prediction circuit 5 and the motion prediction/compensation circuit 6, sets thus acquired information to header information of the output data D4, and outputs the result. The acquiring information includes information about an intra prediction mode relating to intra coding, information about a motion vector relating to inter coding, or others.

A storage buffer 11 stores therein the output data D4 provided by the reverse coding device 10, and outputs the data by the transmission speed of the subsequent transmission path. The rate control circuit 9 monitors the code amount to be generated as a result of the coding process by monitoring the free space of the storage buffer 11. Based on the monitor result, the rate control circuit 9 changes the quantization scale in the quantization circuit 8, thereby exercising control over the code amount to be generated by the coding device 1.

An inverse quantization circuit 13 applies inverse quantization to the output data of the quantization circuit 8, and reproduces the input data of the quantization circuit 8. An inverse orthogonal transform circuit 14 applies inverse orthogonal transform to the output data of the inverse quantization circuit 13, thereby reproducing the input data of the orthogonal transform circuit 7. A deblock filter 15 eliminates any block distortion observed in the output data of the inverse orthogonal transform circuit 14, and outputs the result. A frame memory 16 adds, as appropriate, a prediction value to the output data of the deblock filter 15, and records the result as reference image information. The prediction value is the one generated, as appropriate, by the intra prediction circuit 5 or the motion prediction/compensation circuit 6.

The motion prediction/compensation circuit 6 detects, with inter coding, a motion vector of the image data provided by the image sorting buffer 3 using a prediction frame of the reference image information stored in the frame memory 16. Based on thus detected motion vector, the motion prediction/compensation circuit 6 applies motion compensation to the reference image information stored in the frame memory 16 so that prediction image information is generated. A prediction value of the resulting prediction image information is then forwarded to the subtracter 4.

With intra coding, the intra prediction circuit 5 determines an intra prediction mode based on the reference image information stored in the frame memory 16. Based on the determination result, the intra prediction circuit 5 generates a prediction value for the prediction image information from the reference image information, and outputs the resulting value to the subtracter 4.

As such, in the coding scheme, the differential data D2 is generated by inter coding as a result of motion compensation relating to inter prediction, and another differential data D2 is generated by intra coding as a result of intra prediction. These differential data D2 is then subjected to orthogonal transform, quantization, and variable-length coding before transmission.

FIG. 5 is a block diagram showing a decoding device that decodes the coded data D4 through the coding process as such. In this decoding device 20, a storage buffer 21 stores the coded data D4 provided over the transmission path for a temporary basis before output. A reverse decoding circuit 22 applies a decoding process, e.g., variable-length decoding or arithmetic decoding, to the output data of the storage buffer 21, and reproduces the input data of the reverse coding device 10 in the coding device 1. At this time, if this output data is intra-coded data, the information stored in the header about the intra prediction mode is decoded for transmission to an intra prediction circuit 23. On the other hand, if this output data is inter-coded data, the information stored in the header about the motion vector is decoded for transmission to a motion prediction/compensation circuit 24.

The inverse quantization circuit 25 applies inverse quantization to the output data of the reverse decoding circuit 22, thereby reproducing the transform coefficient data D3 provided to the quantization circuit 8 of the coding device 1. The inverse orthogonal transform circuit 26 receives the transform coefficient data provided by the inverse quantization circuit 25, and applies thereto fourth-order inverse orthogonal transform. This accordingly reproduces the differential data D2 to be provided to the orthogonal transform circuit 7 of the coding device 1.

An adder 27 receives the differential data D2 provided by the inverse orthogonal transform circuit 26, and with intra coding, adds, to the differential data D2, a prediction value in a prediction image to be generated by the intra prediction circuit 23, and outputs the addition result. With inter coding, on the other hand, the adder 27 adds, to the differential data D2, a prediction value in a prediction image provided by the motion prediction/compensation circuit 24, and outputs the addition result. In this manner, the adder 27 reproduces the input data of the subtracter 4 in the coding device 1.

A deblock filter 28 eliminates any block distortion observed in the output data of the adder 27, and outputs the result. An image sorting buffer 29 applies frame sorting, based on the GOP structure, to the image data provided by the deblock filter 28, and outputs the result. A digital/analog conversion circuit (D/A) 30 subjects the output data of the image sorting buffer 29 to D/A conversion, and outputs the conversion result.

A frame memory 31 records and stores therein the output data of the deblock filter 28 as reference image information. The motion prediction/compensation circuit 24 applies motion compensation to the reference image information stored in the frame memory 31, and generates a prediction value of a prediction image. For such motion compensation, used is information about a motion vector notified by the reverse decoding circuit 22. The resulting prediction value is forwarded to the adder 27. The intra prediction circuit 23 generates, with intra coding, a prediction value of a prediction image based on the reference image information stored in the frame memory 31 in the intra prediction mode, which is notified by the reverse decoding circuit 22. The resulting prediction value is forwarded to the adder 27.

For intra coding relating to such a coding process, an intra 4×4 prediction mode and an intra 16×16 prediction mode are ready for use. Herein, with the AVC, the differential data D2 is subjected to orthogonal transform on the basis of a 4×4 pixel block, and the intra 4×4 prediction mode is of generating a prediction value relating to the intra prediction on the basis of a block for orthogonal transform. On the other hand, the intra 16×16 prediction mode is of generating a prediction value relating to the intra prediction on the basis of a plurality of blocks for orthogonal transform. A setting is so made that two of these blocks are set to the horizontal direction, and two to the vertical direction.

In the intra 4×4 prediction mode, as shown in FIG. 6, with respect to a block for generating a prediction value, i.e., a 4×4 pixel block including pixels a to p, the neighboring 13 pixels A to M are partially set as prediction pixels for use for generation of a prediction value, and using the prediction pixels, a prediction value is generated. Note here that these 13 pixels A to M include four pixels A to D, four pixels E to H, four pixels I to L, and a pixel M. The pixels A to D are vertically arranged in a row from a scanning start edge of the block, and the pixels E to H are arranged in a row subsequent to the pixel D located at the scanning end edge of the block. The pixels I to L are horizontally arranged in a row from the scanning start edge of the block, and the pixel M is located above the pixel 1, being one of the four horizontally-arranged pixels I to L, at the scanning start edge.

In the intra 4×4 prediction mode, with the relative relationship among these 13 pixels A to M and 4×4 pixels a to p for use for generation of a prediction value, as shown in FIGS. 7 and 8, prediction modes of 0 to 8 are defined.

More specifically, as indicated by arrows in FIG. 9A, the mode 0 is of generating a prediction value using the vertically-adjacent pixels A to D. In the mode 0, out of 4×4 pixels a to p generating a prediction value, the vertically-adjacent pixels a, e, i, and m on the first column are set with the pixel A thereabove as a prediction pixel. For the pixels b, f, j, and n on the subsequent 2nd column, the pixel B thereabove is set as a prediction pixel. For the pixels c, g, k, and o on the subsequent third column, the pixel C thereabove is set as a prediction pixel, and for the pixels d, h, l, and p on the subsequent fourth column, the pixel D thereabove is set as a prediction pixel. The pixel values of these prediction pixels A to D are each set as a prediction value of their corresponding pixels a to p. Note here that the mode 0 is applied only when the prediction pixels A to D are considered significant in this mode.

As shown in FIG. 9B, similarly, the mode 1 is of generating a prediction value using the horizontally-adjacent pixels I to L. In the mode 1, out of 4×4 pixels a to p generating a prediction value, the horizontally-adjacent pixels a to d on the first line are set with the pixel I adjacent to the left as a prediction pixel. For the pixels e to h on the subsequent 2nd line, the pixel J adjacent to the left is set as a prediction pixel. For the pixels i to l on the subsequent third line, the pixel K adjacent to the left is set as a prediction pixel, and for the pixels m to p on the subsequent fourth line, the pixel L adjacent to the left is set as a prediction pixel. The pixel values of these prediction pixels I to L are each set as a prediction value of their corresponding pixels a to p. Note here that the mode 1 is applied only when the prediction pixels I to L are considered significant in this mode.

As shown in FIG. 9C, out of the 13 pixels A to M, the mode 2 is of generating a prediction value by the vertically-adjacent pixels A to D, and the horizontally-adjacent pixels I to L in the block. When these pixels A to D and I to L are all considered significant, the prediction values are generated for the pixels a to p by the following Equation 1.

$$(A+B+C+D+I+J+K+L+4)>>3 \quad (1)$$

In the mode 2, when the pixels A to D are not all considered significant, a prediction value is generated by Equation 2, when the pixels I to L are not all considered significant, a prediction value is generated by Equation 3, and when these pixels A to D and I to L are not all considered significant, a prediction value is set to 128.

$$(I+J+K+L+2)>>2 \quad (2)$$

$$(A+B+C+D+2)>>2 \quad (3)$$

As shown in FIG. 9D, out of the 13 pixels A to M, the mode 3 is of generating a prediction value by the horizontally-adjacent pixels A to H. The mode 3 is applied only when these pixels A to D and I to L out of these pixels A to H are all considered significant, and the prediction values are generated for the pixels a to p by the following Equation 4.

$a:(A+2B+C+2)>>2$ $b,e:(B+2C+D+2)>>2$ $c,f,i:(C+2D+E+2)>>2$ $d,g,j,m:(D+2E+F+2)>>2$ $h,k,n:(E+2F+G+2)>>2$ $l,o:(F+2G+H+2)>>2$ $$p:(G+3H+2)>>2 \quad (4)$$

As shown in FIG. 9E, out of the 13 pixels A to M, the mode 4 is of generating a prediction value by the pixels A to D and I to M adjacent to the 4×4 pixel block including the pixels a to p. The mode 4 is applied only when these pixels A to D and I to M are all considered significant, and the prediction values are generated for the pixels a to p by the following Equation 5.

$m:(J+2K+L+2)>>2$ $i,n:(I+2J+K+2)>>2$ $e,j,o:(M+2I+J+2)>>2$ $a,f,k,p:(A+2M+I+2)>>2$ $b,g,l:(M+2A+B+2)>>2$ $c,h:(A+2B+C+2)>>2$ $$d:(B+2C+D+2)>>2 \quad (5)$$

As shown in FIG. 9F, similarly to the mode 4, out of the 13 pixels A to M, the mode 5 is of generating a prediction value by the pixels A to D and I to M adjacent to the 4×4 pixel block including the pixels a to p. The mode 5 is applied only when these pixels A to D and I to M are all considered significant, and the prediction values are generated for the pixels a to p by the following Equation 6.

$a,j:(M+A+1)>>1$ $b,k:(A+B+1)>>1$ $c,l:(B+C+1)>>1$ $d:(C+D+1)>>1$ $e,n:(I+2M+A+2)>>2$ $f,o:(M+2A+B+2)>>2$ $g,p:(A+2B+C+2)>>2$ $h:(B+2C+D+2)>>2$ $i:(M+2I+J+2)>>2$ $$m:(I+2J+K+2)>>2 \quad (6)$$

As shown in FIG. 9G, similarly to the modes 4 and 5, out of the 13 pixels A to M, the mode 6 is of generating a prediction value by the pixels A to D and I to M adjacent to the 4×4 pixel block including the pixels a to p. The mode 6 is applied only when these pixels A to D and I to M are all considered significant, and the prediction values are generated for the pixels a to p by the following Equation 7.

$a,g:(M+I+1)>>1$ $b,h:(I+2M+A+2)>>2$ $c:(M+2A+B+2)>>2$ $d:(A+2B+C+2)>>2$ $e,k:(I+J+1)>>1$ $f,l:(M+2I+J+2)>>2$ $i,o:(J+K+1)>>1$ $j,p:(I+2J+K+2)>>2$ $m:(K+L+1)>>1$ $$n:(J+2K+L+2)>>2 \quad (7)$$

As shown in FIG. 9H, out of the 13 pixels A to M, the mode 7 is of generating a prediction value by the four pixels A to D located above the 4×4 pixel block including the pixels a to p, and the four pixels E to G subsequent to the four pixels A to D. The mode 7 is applied only when these pixels A to D and I to M are all considered significant, and the prediction values are generated for the pixels a to p by the following Equation 8.

$a:(A+B+1)>>1$ $b,i:(B+C+1)>>1$ $c,j:(C+D+1)>>1$ $d,k:(D+E+1)>>1$ $l:(E+F+1)\gg 1$ $e:(A+2B+C+2)\gg 2$ $f,m:(B+2C+D+2)\gg 2$ $g,n:(C+2D+E+2)\gg 2$ $h,o:(D+2E+F+2)\gg 2$ $p:(E+2F+G+2)\gg 2$ (8)

As shown in FIG. 9I, out of the 13 pixels A to M, the mode 8 is of generating a prediction value by the four pixels I to L adjacent to the left of the 4×4 pixel block. The mode 8 is applied only when these pixels A to D and I to M are all considered significant, and the prediction values are generated for the pixels a to p by the following Equation 9.

$a:(I+J+1)\gg 1$ $b:(I+2J+K+2)\gg 2$ $c,e:(J+K+1)\gg 1$ $d,f:(J+2K+L+2)\gg 2$ $g,i:(K+L+1)\gg 1$ $h,j:(K+3L+2)\gg 2$ $k,l,m,n,o,p:L$ (9)

In the intra 16×16 prediction mode, as shown in FIG. 10, in a block B including 16×16 pixels P(0,15) to P(15,15) for use for generation of a prediction value, prediction pixels are the pixels P(0,15) to P(15,15) configuring the block B, and pixels P(0,−1) to P(15,−1) and P(−1, 0) to P(−1,15) adjacent to above and to the left of the block B. By these prediction pixels, prediction values are generated.

In the intra 16×16 prediction mode, as shown in FIG. 11, prediction modes of 0 to 3 are defined. The mode 0 is applied only when the pixels adjacent to the above of the block B, i.e., P(0,−1) to P(15,−1)(P(x,−1); x,y=−1 to 15), are considered significant. As indicated by the following Equation 10, prediction values are generated for the pixels P(0,15) to P(15,15) configuring the block B. As shown in FIG. 12A, by the pixel values of pixels P(0,−1) to P(15,−1) adjacent to the block B, the prediction values are generated for the pixels vertically arranged in a row in the block B.

$\text{Pred}(x,y)=P(x,-1) x,y=0\ldots 15$ (10)

The mode 1 is applied only when the pixels adjacent to the left of the block B, i.e., P(−1,0) to P(−1,15)(P(−1,y); x,y=−1 to 15) are considered significant. As indicated by the following Equation 11, prediction values are generated for the pixels P(0,15) to P(15,15) configuring the block B. As shown in FIG. 12B, by the pixel values of pixels P(−1,0) to P(−1,15) adjacent to the block B, the prediction values are generated for the pixels horizontally arranged in a row in the block B.

$\text{Pred}(x,y)=P(-1,y); x,y=0\ldots 15$ (11)

In the mode 2, when the pixels adjacent to above and to the left of the block B, i.e., P(0,−1) to P(15,−1), and P(−1,0) to P(−1,15) are all considered significant, the prediction values are calculated by the following Equation 12. As shown in FIG. 12C, an average value of the pixel values of the pixels P(0,−1) to P(15,−1), and P(−1,0) to P(−1,15) is used as a basis to generate a prediction value for each of the pixels configuring the block B.

$$\text{Pred}(x,y) = \left[\sum_{x'=0}^{15} P(x',-1) + \sum_{y'=0}^{15} P(-1,y') + 16\right] \gg 5 \quad (12)$$

with $x, y = 0\ldots 15$

In the mode 2, out of the pixels adjacent to above and to the left of the block B, i.e., (0,−1) to P(15,−1) and P(−1,0) to P(−1,15), when the pixels adjacent to above, i.e., (−1,0) to P(−1, 15) are not considered significant, the Equation 13 is applied so that a prediction value is calculated for each of the pixels using an average value of the adjacent pixels on the significant side. When the pixels P(−1,0) to P(−1,15) adjacent to the left are not considered significant, the Equation 14 is applied so that a prediction value is also calculated for each of the pixels configuring the block B using an average value of the adjacent pixels on the significant side. When none of the pixels adjacent to above or to the left of the block B, i.e., P(0,−1) to P(15,−1) and P(−1,0) to P(−1,15), are not all considered significant, a prediction value is set to 128.

$$\text{Pred}(x,y) = \left[\sum_{y'=0}^{15} P(-1,y') + 8\right] \gg 4 \quad (13)$$

with $x, y = 0\ldots 15$ $$\text{Pred}(x,y) = \left[\sum_{x'=0}^{15} P(x',-1) + 8\right] \gg 4 \quad (14)$$

with $x, y = 0\ldots 15$.

The mode 3 is applied only when the pixels adjacent to above and to the left of the block B, i.e., P(0,−1) to P(15,−1) and P(−1,0) to P(−1,15), are all considered significant, and prediction values are calculated by the following Equation 15. As shown in FIG. 12D, a prediction value is generated for each of the pixels by computation in the diagonal direction. Herein, Clip1 denotes clipping for a value range of 0 to 255.

$\text{Pred}(x,y) = \text{Clip1}((a + b\cdot(x-7) + c\cdot(y-7) + 16) \gg 5)$ (15)

$a = 16\cdot(P(-1,15) + P(15,-1))$ $b = (5\cdot H + 32) \gg 6$ $c = (5\cdot V + 32) \gg 6$ $H = \sum_{x=1}^{8} x\cdot(P(7+x,-1) - P(7-x,-1))$ $V = \sum_{y=1}^{8} y\cdot(P(-1,7+y) - P(-1,7-y))$ As such, in pictures of I, P, and B, the intra prediction device 5 of the coding device 1 receives the image data D1 provided by the image sorting buffer 3, and selects an optimum prediction mode by so-called intra prediction using the reference image information stored in the frame memory 16. For intra coding with the selected prediction mode, a prediction value in this selected prediction mode is generated using the reference image information, and the resulting value is forwarded to the subtracter 4. The prediction mode is also notified to the reverse coding device 10 for transmission together with the coded data D4. In response thereto, the intra prediction device 23 of the decoding device 20 calculates a prediction value using the information about the prediction mode provided thereto together with the coded data D4, and outputs the resulting value to the adder 27.

With inter coding, on the other hand, as shown in FIG. 13, using multiple reference frames, any of a plurality of reference frames Ref is selected for a process target frame Org for motion compensation. Such motion compensation can be performed with a high accuracy, and the data compression efficiency can be increased. This is applicable even if the immediately-preceding frame secretly has any portion corresponding to a block for motion compensation, or even if the entire pixel values temporarily show some change in the immediately-preceding frame by flash, for example.

As shown in (A1) of FIG. 14, a block for motion compensation is subjected to motion compensation with reference to a block of 16×16 pixels, and tree-structured motion compensation is supported by variable MCBlock Size. As shown in (A2) to (A4) of FIG. 14, the block of 16×16 pixels is divided into two in the horizontal or vertical direction. The resulting sub-blocks of 16×8 pixels, 8×16 pixels, and 8×8 pixels can be separately set with a motion vector and a reference frame for motion compensation. As shown in (B1) to (B4) of FIG. 14, the sub-block of 8×8 pixels can be divided into, to a further degree, blocks of 8×8 pixels, 8×4 pixels, 4×8 pixels, and 4×4 pixels. These blocks can be separately set with a motion vector and a reference frame for motion compensation.

The motion compensation is performed using a 6-tap FIR (Finite Impulse Response) filter with an accuracy of ¼ pixel. In FIG. 15, pixels denoted by uppercase characters are each with an accuracy of pixel, and pixels denoted by lowercase characters are with an accuracy of ½ pixel or ¼ pixel. With motion compensation, first of all, tap inputs of the 6-tap FIR filter are each weighted by values of 1, −5, 20, 20, −5, and 1, and then are sequentially subjected to computation of the following Equation 16. In this manner, the pixel values b and h of pixels with an accuracy of ½ pixel are calculated between any adjacent pixels in the horizontal or vertical direction.

$b1=(E-5F+20G+20H-5H+J)$ $h1=(A-5C+20G+20M-5R+T)$ $b=\text{Clip1}((b1+16)\gg 5)$ $h=\text{Clip1}((h1+16)\gg 5)$ (16)

Using the pixel value b or h calculated as such with an accuracy of ½ pixel, the tap inputs of the 6-tap FIR filter are each weighted by values of 1, −5, 20, 20, −5, and 1, and then are sequentially subjected to computation of the following Equation 17. In this manner, a pixel value j of a pixel with an accuracy of ½ pixel is calculated between any adjacent pixels in the horizontal or vertical direction.

$j1=cc-5dd+20h+20m-5ee+ff$ or $j1=aa-5bb+20b+20s-5gg+hh$ $j=\text{Clip1}((j1+512)\gg 10)$ (17)

By linear interpolation using the pixel values b, h, and j calculated as such with an accuracy of ½ pixel, pixel values a, d, e, and others are calculated with the accuracy of ¼ pixel. Note here that, the process of normalization relating to the weight addition in the Equations 16 and 17 is executed after completion of interpolation entirely in the vertical and horizontal directions.

As shown in FIG. 16, as to a color-difference signal, a pixel value with an accuracy of a few pixels is directly calculated from a pixel of integer accuracy by the computation of the following equation 18, i.e., computation of linear interpolation. In FIG. 16, characters dx and dy denote interpolation coefficients in the horizontal and vertical directions, respectively, and the characters A to D each denote a pixel value.

$$v = \frac{(s-d^x)(s-d^y)A + d^x(s-d^y)B + (s-d^x)d^yC + d^xd^yD + s^2/2}{s^2}$$ (18)

As such, in the P and B pictures, the motion prediction/compensation device 6 in the coding device 1 uses a plurality of prediction frames to detect a motion vector for every macroblock and sub-block with an accuracy of ¼ pixel. Herein, the prediction frames are those defined by levels and profiles of the coding process using the reference image information stored in the frame memory 16. The detection results are then searched for a motion vector of a reference frame showing the smallest prediction residual. Using the reference frame detected as such, the reference image information stored in the frame memory 16 is subjected to motion compensation with an accuracy of ¼ pixel so that so-called inter prediction is executed. If with inter coding by such inter prediction, the pixel value as a result of motion compensation is forwarded to the subtracter 4 as a prediction value, and a notification is made to the reverse coding device 10 about the reference frame, the block, and the motion vector for transmission together with the coded data D4.

On the other hand, the motion prediction/compensation device 24 of the decoding device 20 subjects the reference image information to motion compensation with the accuracy of ¼ pixel, and generates a prediction value. Such motion compensation is applied using the reference frame and the motion vector transmitted together with the coded data D4, and the reference image information is the one stored in the frame memory 16. In the P and B pictures, the coding device 1 selects either intra coding or inter coding based on the result of the intra prediction derived by the intra prediction device 5, and the result of the inter prediction derived by the motion prediction/compensation device 6, for example. Based on the selection result, the intra prediction device 5 and the motion prediction/compensation device 6 output prediction values derived by intra and inter prediction, respectively.

As shown in FIG. 17, for coding an interlaced video signal, the coding process with the AVC defines a pair of macroblocks adjacent to each other in the vertical direction in a frame, i.e., a macroblock pair. The macroblock pair can be subjected to the coding process in a field mode or a frame mode.

On the other hand, the rate control by the rate control device 9 is exercised by the technique of TM5 (MPEG-2 Test Model 5). Here, the rate control with TM5 is executed by controlling a quantization scale of the quantization device 8 by execution of the process procedure shown in FIG. 18. That is, in the rate control device 9, when the process is started, the procedure goes to step 1. In step 1, as to pictures configuring a GOP, a target code amount is calculated for any not-yet-processed picture so that a bit allocation is made to the picture. Herein, with TM5, the code amount for allocation to each of the pictures is calculated based on the following two assumptions.

The first assumption is that the product of an average quantization scale and the generated code amount remains constant in the individual picture type as long as the screen remains the same. Herein, the average quantization scale is the one used for coding the pictures. As such, by the rate control, parameters Xi, Xp, and Xb (global complexity measure) are updated by the following Equation 19 for every picture type after the coding process is executed to each of the pictures. Here, the parameters Xi, Xp, and Xb are those representing the screen complexity. As such, under the rate control with TM5, using such parameters Xi, Xp, and Xb, the relationship is assumed between a quantization scale code and the generated code amount at the time of the coding process for the next picture.

$X_i = S_i Q_i$ $X_p = S_p Q_p$ $X_b = S_b Q_b$ (19)

Here, the variables provided with numerical subscripts in Equation 19 each denote I picture, P picture, and B picture. The characters Si, Sp, and Sb each denote the generated coded bit amount as a result of the coding process applied to the pictures, and the characters Qi, Qp, and Qb each denote an average quantization scale code at the time of coding the pictures. The initial values of the parameters Xi, Xp, and Xb are calculated by the following Equation 20 using a target code amount bit rate [bit/sec].

$X_i = 160 \times \text{bit\_rate}/115$ $X_p = 60 \times \text{bit\_rate}/115$ $X_b = 42 \times \text{bit\_rate}/115$ (20)

The second assumption is that the entire image quality is typically maximized when the following Equation is satisfied between ratios Kp and Kb. The ratio Kp is of a quantization scale code of a P picture to a quantization scale of an I picture, and a rate Kb is of a quantization scale code of a B picture to a quantization scale of the I picture.

$K_p = 1.0; K_b = 1.4$ (21)

That is, this assumption means that the entire image quality is maximized by making the quantization scale of the B picture remain 1.4 times of the quantization scale of the I and P pictures. The B picture is coarsely quantized compared with the I and P pictures so that the code amount for allocation to the B picture is saved. Thus saved code amount is allocated to the I and P pictures so that the image quality of the I and P pictures is improved. This accordingly improves the image quality of the B picture for reference use of the I and P pictures so that the entire image quality can be maximized.

As such, the rate control device 9 calculates allocation bit amounts Ti, Tp, and Tb for each of the pictures by the computation of the following Equation 22. Note here that the characters Np and Nb denote the number of P and B pictures, respectively, which are not yet coded in a GOP being a process target.

$$T_i = \max\left\{ \frac{R}{1 + \frac{N_p X_p}{X_i K_p} + \frac{N_b X_b}{X_i K_b}}, \text{bit\_rate}/(8 \times \text{picture\_rate}) \right\}$$ (22)

$$T_p = \max\left\{ \frac{R}{N_p + \frac{N_b K_p X_b}{K_b X_p}}, \text{bit\_rate}/(8 \times \text{picture\_rate}) \right\}$$

-continued $$T_b = \max\left\{ \frac{R}{N_b + \frac{N_p K_b X_p}{K_p X_b}}, \text{bit\_rate}/(8 \times \text{picture\_rate}) \right\}$$

Based on the two assumptions described above, the rate control device 9 estimates the code amount to be generated for each of the pictures. At this time, for any picture of a picture type different from that of a target for code amount allocation, the rate control device 9 estimates how much larger the code amount to be generated by the picture is than the code amount of the target picture for the code amount allocation under conditions of image quality maximization. With the estimation result, it is estimated how many pictures of a picture type being the target for code amount allocation are the equivalent of the not-yet-coded picture in the GOP. With the estimation result, the bit amount is calculated for allocation to each of the pictures. In this case, before calculating the bit amount for allocation, the rate control device 9 sets a lower limit to the code amount that is constantly needed for header or others.

As such, every time completing coding a picture, the rate control device 9 goes through the computation of the following Equation 23, and corrects a bit amount R for allocation to the not-yet-coded picture(s) in the GOP using an actually-generated code amount S.

$R = R - S_{i,p,b}$ (23)

For the picture at the head of the GOP, instead of the computation of Equation 23, the following Equation 24 is used to calculate the bit amount R for allocation to the not-yet-coded picture(s) in the GOP. In Equation 24, the character N on the right side denotes the number of pictures in a GOP, and the character R on the right side denotes a bit amount left unprocessed for the GOP, i.e., value 0 at the head of the sequence.

$R = \text{bit\_rate} \times N/\text{picture\_rate} + R$ (24)

Under the rate control with TM5, the procedure goes to step 2, and the rate control is exercised using virtual buffer control. With such rate control, three types of a virtual buffer are set separately to each of the picture types to establish a matching between the bit amounts Ti, Tp, and Tb calculated in step 1 for allocation to each of the pictures, and the actually-generated code amount. Based on the capacities of the virtual buffers, the quantization scale of the quantization device 8 is calculated by feedback control on a macroblock basis.

Calculated first is the occupancy of these three types of virtual buffer by the computation of the following Equation 25. Herein, characters d0i, d0p, and d0b denote an initial occupancy of the respective virtual buffers, a character Bj denotes the bit amount generated from the head of the picture to the j-th macroblock, and MB#cnt denotes the number of macroblocks in a picture.

$$d_j^i = d_0^i + \sum_{n=0}^{j-1} Bit_n - \frac{T_i \times (j-1)}{\text{MB\_cnt}}$$ (25)

$$d_j^p = d_0^p + \sum_{n=0}^{j-1} Bit_n - \frac{T_p \times (j-1)}{\text{MB\_cnt}}$$

$$d_j^b = d_0^b + \sum_{n=0}^{j-1} Bit_n - \frac{T_b \times (j-1)}{\text{MB\_cnt}}$$

Based on the calculation result of Equation 25, the quantization scale is calculated for the j-th macroblock by the following Equation 26.

$$Q_j = \frac{d_j \times 31}{r} \quad (26)$$

Herein, a character r denotes a reaction parameter, which controls the feedback response. With TM5, the reaction parameter r, and the initial values $d0i$, $d0p$, and $d0b$ of the virtual buffers at the head of the sequence are calculated by the following Equation 27.

$$r = \frac{2 \times \text{bit\_rate}}{\text{picture\_rate}} \quad (27)$$

$$d_0^i = 10 \times r / 31$$

$$d_0^p = K_p d_0^i$$

$$d_0^b = K_b d_0^i$$

Under the rate control with TM5, the procedure goes to step 3. In step 3, the quantization scale derived in step 2 is corrected with consideration given to the visual characteristics, thereby performing optimum quantization with consideration given to the visual characteristics. Herein, the optimum quantization is performed by correcting the quantization scale derived in step 2 based on the activity of each of the macroblocks, i.e., any flat portion where quality deterioration is easily perceived is finely quantized, and any pattern-complicated portion where image deterioration is not relatively easily perceived is coarsely quantized.

Herein, the activity is calculated by the following Equation 28 for every macroblock of the size of 16×16 pixels. For four blocks of 8×8 pixels configuring a macroblock, used are pixel values of eight blocks, i.e., four blocks in a frame DCT mode, and four blocks in a field DCT mode. The resulting value indicates the smoothness of the brightness level in the corresponding macroblock.

$$act_j = 1 + \min_{sblk=1,8}(\text{var } sblk) \quad (28)$$

$$\text{var } sblk = \frac{1}{64}\sum_{k=1}^{64}(P_k - \bar{P})^2$$

$$\bar{P} = \frac{1}{64}\sum_{k=1}^{64} P_k$$

In Equation 28, the character Pk denotes a pixel value in a brightness signal block of an original image. This Equation 28 takes a minimum value for the purpose of preventing image quality deterioration by performing quantization with more steps if the macroblock has any flat portion.

Using the following Equation 29, the rate control device 9 normalizes the resulting activity calculated by Equation 28, and derives a normalized activity Nactj whose value falls in a value range from 0.5 to 2. Herein, avg act denotes an average value of an activity actj in the precedingly-coded picture.

$$Nact_j = \frac{2 \times act_j + avg\ act}{act_j + 2 \times avg\ act} \quad (29)$$

Using the normalized activity Nactj, the computation of the following Equation 30 is performed, and the quantization scale Qj derived in step 2 is corrected so that the quantization device 8 is put under the control.

$$m\text{quant}_j = Q_1 \times N\text{act}_j \quad (30)$$

As such, under the rate control with TM5, based on the two assumptions described above, the code amount is allocated to each of the pictures, and by extension, to each of the macroblocks. The quantization scale is then controlled under the feedback control with which the allocated code amounts are sequentially corrected based on the actually-generated code amount so that the coding process is successively executed.

As to such rate control with TM5 in step 2 of FIG. 18, Patent Document 1 (JP-A-2003-61096) describes a method of improving the image quality through control over the code amount to be allocated to each of the macroblocks using the residual of a motion vector.

Under the rate control in step 3 with TM5, the quantization scale derived in step 2 is corrected using the activity of a macroblock, and the quantization scale is corrected with consideration given to the visual characteristics so that the image quality is improved.

With such a method, I pictures are indeed increased in image quality with consideration fully given to the visual characteristics. With inter prediction for P and B pictures, however, there remains a problem of not being able to improve the image quality always appropriately. More specifically, if with any pattern-complicated portion where quality deterioration is not relatively easily noticed, the deterioration becomes conspicuous and is perceived if the portion is not in motion. As a result, with the process in step 3 in the previous method with TM5, the quality deterioration is easily perceived for any letter portions such as captions.

It is thus desirable to provide a coding device, a coding method, a program of the coding method, and a recording medium recorded with the program of the coding method with which, with consideration given to the visual characteristics, the image quality can be improved much better than a previous technique.

SUMMARY OF THE INVENTION

One embodiment of the invention is directed to a coding device that makes a GOP setting to input image data, and applies a coding process to the input image data on a macroblock basis successively by intra and inter prediction to output coded data. The coding device includes an orthogonal transform section that applies an orthogonal transform process to prediction error data of the input image data through the intra and inter prediction to generate coefficient data; a quantization section that applies a quantization process to the coefficient data to generate quantized data; a coding section that applies the coding process to the quantized data to generate the coded data; and a rate control section that exercises rate control over the coded data through control over a quantization scale of the quantization section using the coded data. In the coding device, the rate control section includes an activity detection section that detects an activity indicating the smoothness of the input image data; and a prediction residual detection section that detects a prediction residual with the inter prediction of the input image data. The rate control section calculates, in pictures configuring a GOP, a target code amount of any picture that has not yet been subjected to the coding process, another target code amount for a macroblock of any of the pictures relating to the coding process from the target code amount of the picture not yet subjected to the coding process, and the quantization scale of the quantization section in which a generated code amount serves as the target code amount. The rate control section also corrects the calculated quantization scale based on the activity and the prediction residual for improving image quality with consideration given to visual characteristics.

Another embodiment of the invention is directed to a coding method of making a GOP setting to input image data, and applying a coding process to the input image data on a macroblock basis successively by intra and inter prediction to output coded data. The coding method includes applying an orthogonal transform process to prediction error data of the input image data through the intra and inter prediction to generate coefficient data; applying a quantization process to the coefficient data to generate quantized data; applying the coding process to the quantized data to generate the coded data; and exercising rate control over the coded data through control over a quantization scale in the quantization process using the coded data. In the coding method, the rate control step includes detecting an activity indicating the smoothness of the input image data; detecting a prediction residual by the inter prediction of the input image data; calculating, in pictures configuring a GOP, a target code amount of any picture that has not yet been subjected to the coding process; calculating another target code amount for a macroblock of any of the pictures relating to the coding process from the target code amount of the picture not yet subjected to the coding process, and the quantization scale of the quantization process in which a generated code amount serves as the target code amount; and correcting the calculated quantization scale based on the activity and the prediction residual.

A further embodiment of the invention is directed to a program for executing a coding method of making a GOP setting to input image data, and applying a coding process to the input image data on a macroblock basis successively by intra and inter prediction to output coded data, the coding method including applying an orthogonal transform process to prediction error data of the input image data through the intra and inter prediction to generate coefficient data; applying a quantization process to the coefficient data to generate quantized data; applying the coding process to the quantized data to generate the coded data; and exercising rate control over the coded data through control over a quantization scale in the quantization process using the coded data. In the method, the rate control step includes detecting an activity indicating the smoothness of the input image data; detecting a prediction residual by the inter prediction of the input image data; calculating, in pictures configuring a GOP, a target code amount of any picture that has not yet been subjected to the coding process; calculating another target code amount for a macroblock of any of the pictures relating to the coding process from the target code amount of the picture not yet subjected to the coding process, and the quantization scale of the quantization process in which a generated code amount serves as the target code amount; and correcting the calculated quantization scale based on the activity and the prediction residual.

A further embodiment of the invention is directed to a recording medium recorded with a program for executing a coding method of making a GOP setting to input image data, and applying a coding process to the input image data on a macroblock basis successively by intra and inter prediction to output coded data. The coding method includes applying an orthogonal transform process to prediction error data of the input image data through the intra and inter prediction to generate coefficient data; applying a quantization process to the coefficient data to generate quantized data; applying the coding process to the quantized data to generate the coded data; and exercising rate control over the coded data through control over a quantization scale in the quantization process using the coded data. In the coding method, the rate control step includes detecting an activity indicating the smoothness of the input image data; detecting a prediction residual by the inter prediction of the input image data; calculating, in pictures configuring a GOP, a target code amount of any picture that has not yet been subjected to the coding process; calculating another target code amount for a macroblock of any of the pictures relating to the coding process from the target code amount of the picture not yet subjected to the coding process, and the quantization scale of the quantization process in which a generated code amount serves as the target code amount; and correcting the calculated quantization scale based on the activity and the prediction residual.

With the configuration of the embodiment, i.e., including an orthogonal transform section that applies an orthogonal transform process to prediction error data of the input image data through the intra and inter prediction to generate coefficient data; a quantization section that applies a quantization process to the coefficient data to generate quantized data; a coding section that applies the coding process to the quantized data to generate the coded data; and a rate control section that exercises rate control over the coded data through control over a quantization scale of the quantization section using the coded data, with application to a coding device, if quality deterioration is easily perceived even in any pattern-complicated portion where quality deterioration is not relatively easily noticed unless it is not in motion, the image quality deterioration is detected using the prediction residual so that the quantization scale can be accordingly corrected. This is achieved by, as in the first embodiment, the rate control section including an activity detection section that detects an activity indicating the smoothness of the input image data; and a prediction residual detection section that detects a prediction residual with the inter prediction of the input image data, the rate control section calculating, in pictures configuring a GOP, a target code amount of any picture that has not yet been subjected to the coding process, and another target code amount for a macroblock of any of the pictures relating to the coding process from the target code amount of the picture not yet subjected to the coding process, and the quantization scale of the quantization section in which a generated code amount serves as the target code amount, and the rate control section correcting the calculated quantization scale based on the activity and the prediction residual for improving image quality with consideration given to visual characteristics. Accordingly, the motion information about the prediction residual is used to detect any image-deteriorated portion, which is not easily found by an activity of information about an original image, thereby enabling to correct the quantization scale not to deteriorate the image quality. This thus improves the image quality to a further degree compared with the previous technique with consideration given to the visual characteristics.

As such, with the configurations of the other embodiments, there provides a coding method, a program for executing the coding method, and a recording medium recorded with the program for executing the coding method with which, with consideration given to the visual characteristics, the image quality can be improved much better than the previous technique.

According to the embodiments of the invention, it is possible to improve, with consideration given to the visual characteristics, the image quality much better than the previous technique.

BRIEF DESCRIPTION OF THE DRAWINGS

FIG. 8 is a chart showing the intra 4×4 prediction mode;

FIGS. 9A to 9I are schematic diagrams for use of describing modes in the intra 4×4 prediction mode;

FIG. 13 is a schematic diagram for use of describing a reference frame of the AVC scheme;

FIG. 14 is a schematic diagram for use of describing motion compensation with the AVC scheme;

FIG. 15 is a schematic diagram for use of describing a motion compensation accuracy with the AVC scheme;

DETAILED DESCRIPTION

In the below, embodiments of the invention are described in detail by referring to the accompanying drawings.

First Embodiment

1. Configuration

Figure 2:
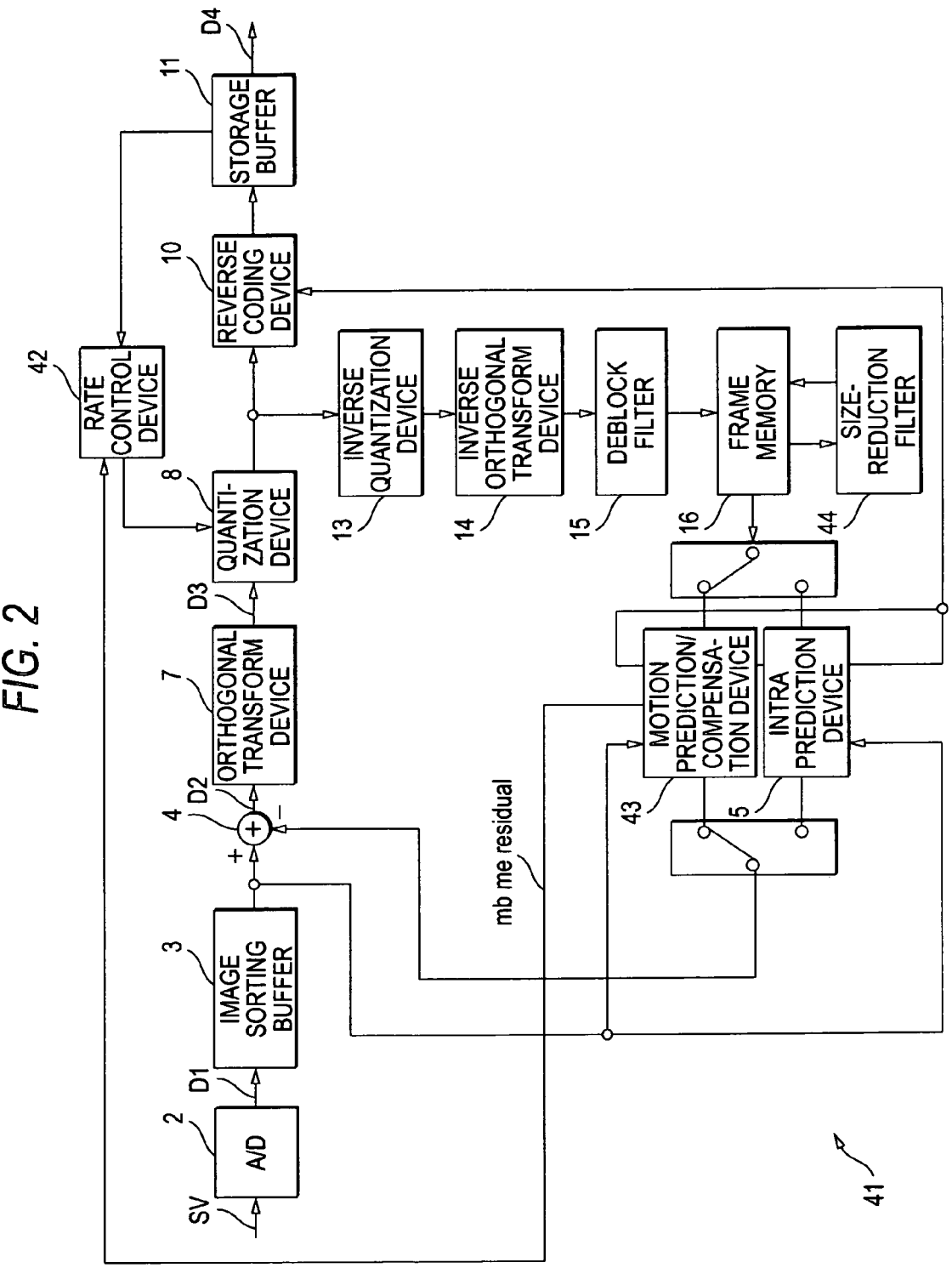
FIG. 2 is a block diagram showing the coding device in the first embodiment of the invention.
Figure 4:
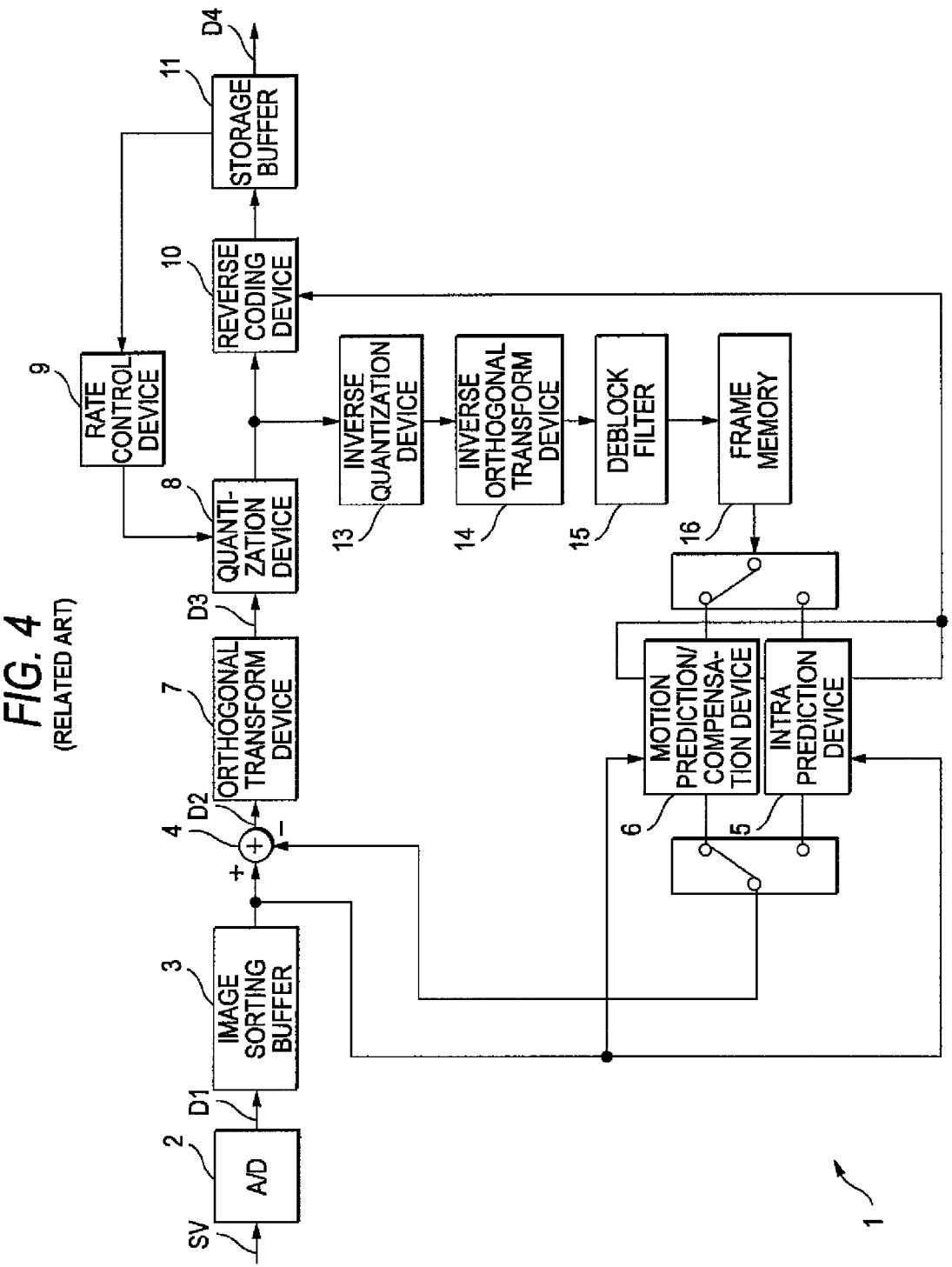
FIG. 4 is a block diagram showing a coding device of an AVC scheme.
Figure 5:
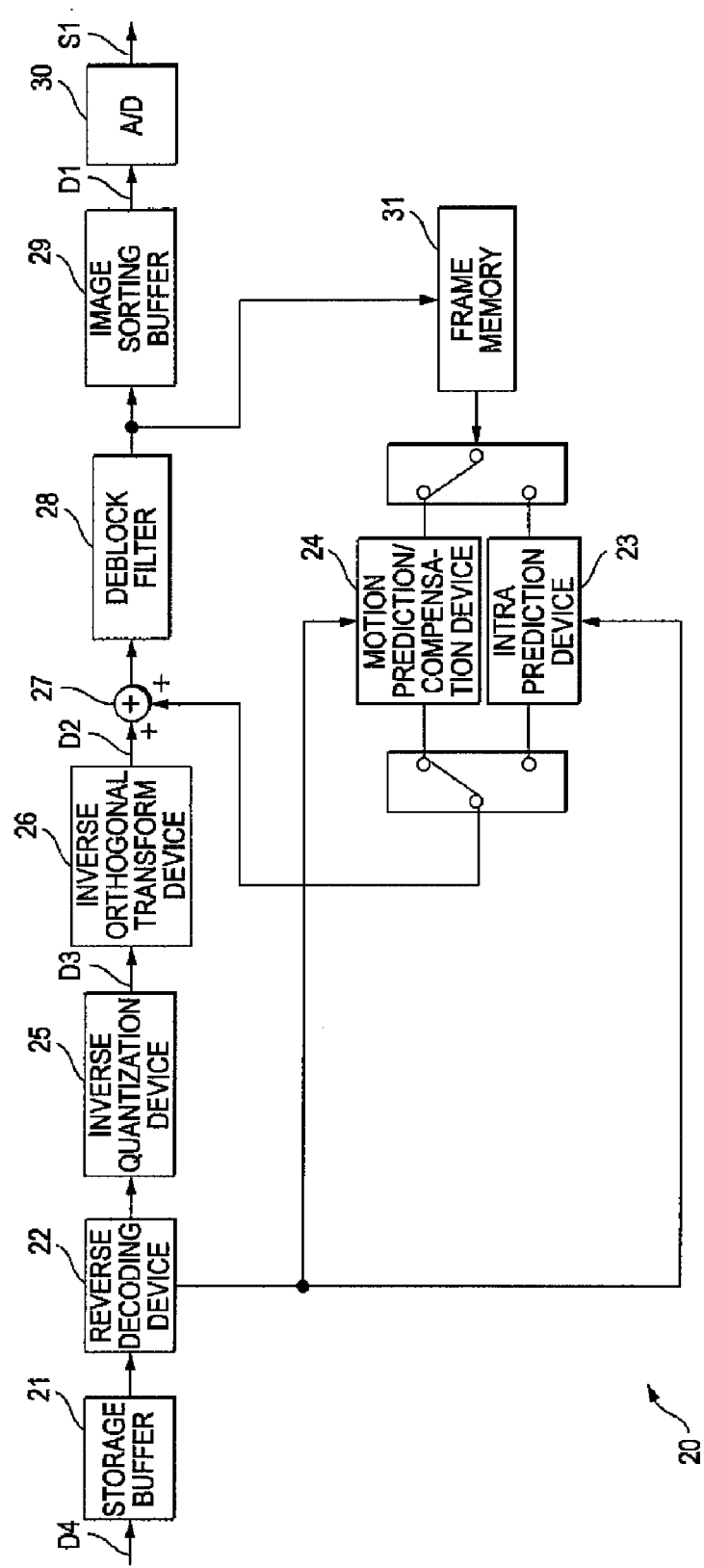
FIG. 5 is a block diagram showing a decoding device of the AVC scheme.
Figure 6:
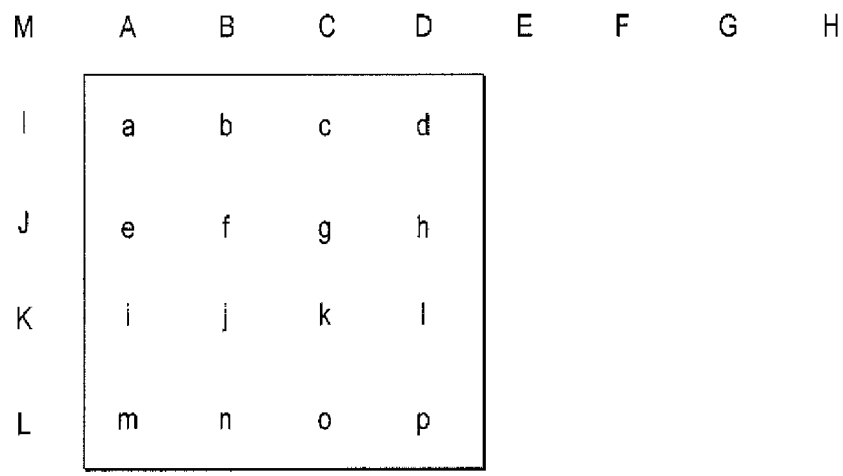
FIG. 6 is a schematic diagram for use of describing prediction pixels in an intra 4×4 prediction mode.
Figure 7:
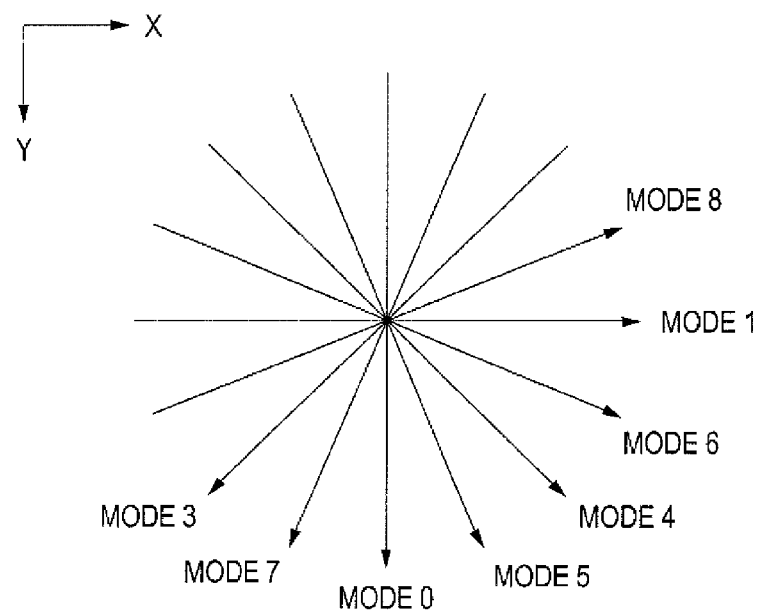
FIG. 7 is a schematic diagram for use of describing a prediction mode in the intra 4×4 prediction mode.
Figures 10, 11:
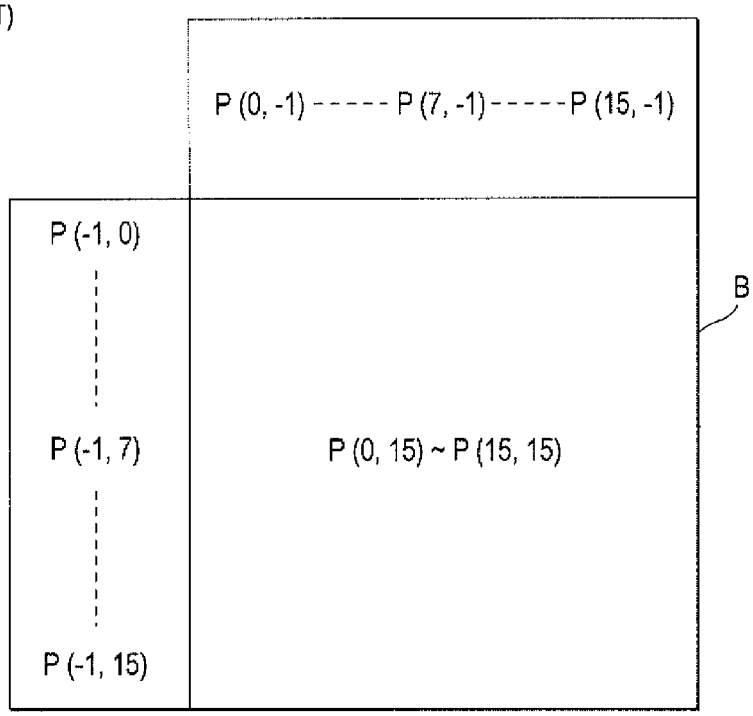
FIG. 10 is a schematic diagram for use of describing prediction pixels in an intra 16×16 prediction mode.
FIG. 11 is a chart showing the intra 16×16 prediction mode.
Figures 12A, 12B, 12C, 12D:
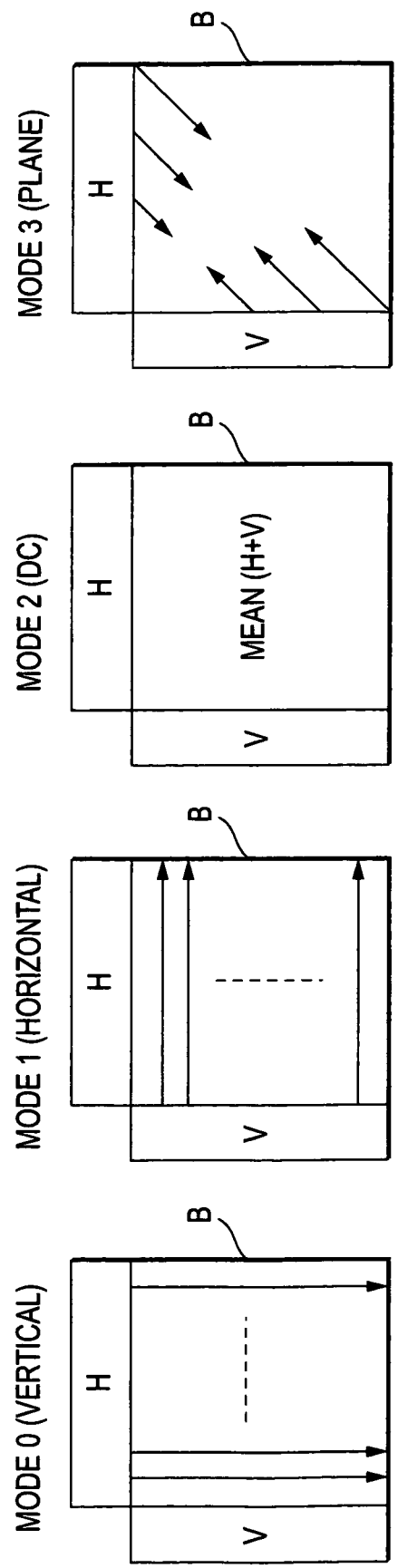
FIGS. 12A, 12B, 12C, and 12D are schematic diagrams for use of describing a prediction mode in the intra 16×16 prediction mode.
Figure 16:
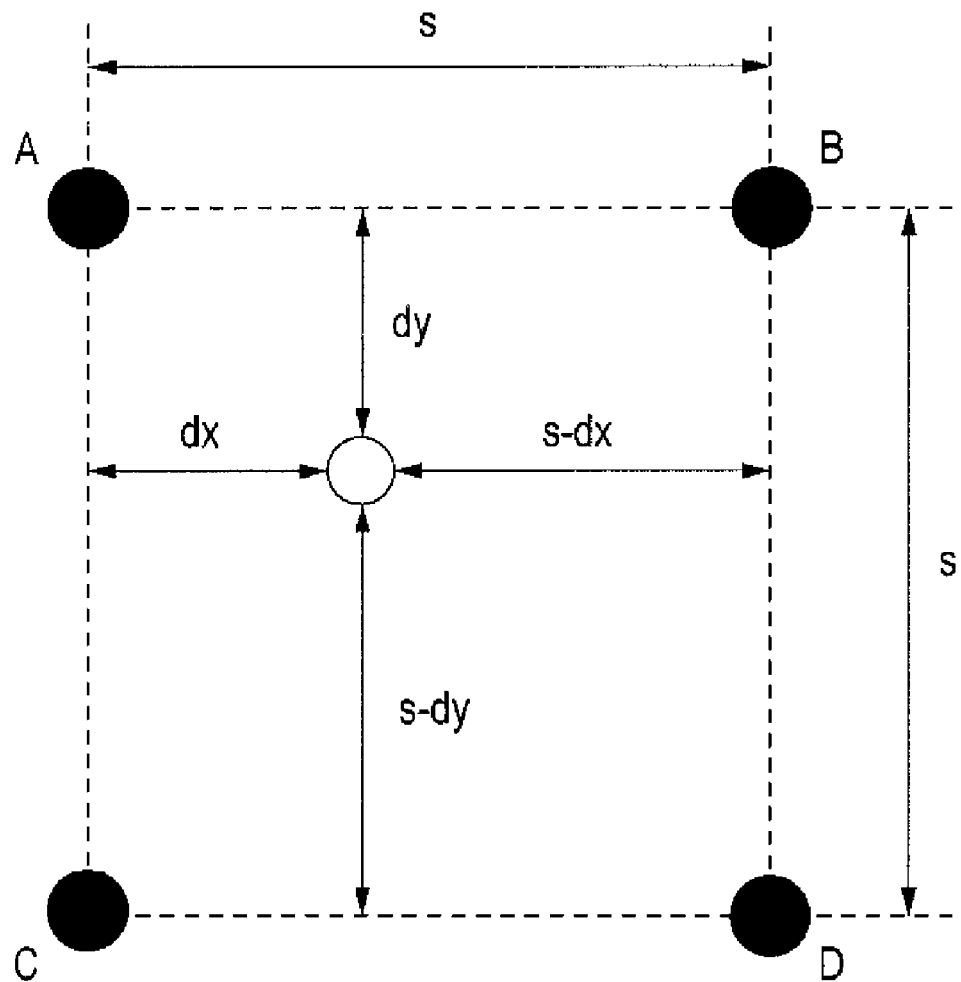
FIG. 16 is a schematic diagram for use of describing a motion compensation accuracy relating to a color-difference signal.
Figure 17:
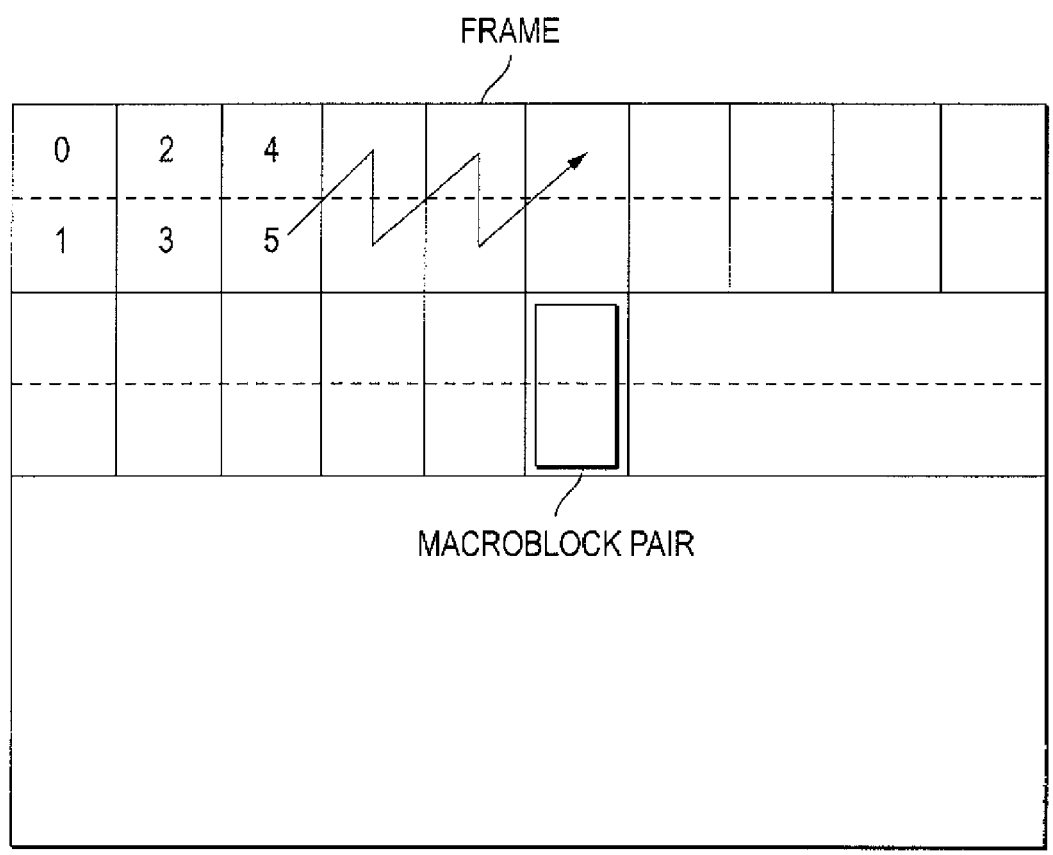
FIG. 17 is a schematic diagram for use of describing a macroblock pair.

FIG. 2 is a block diagram showing a coding device in a first embodiment of the invention. This coding device 41 is configured similarly to the coding device 1 described above by referring to FIG. 4 except a rate control device 42 and a motion prediction/compensation device 43 both differing in configuration. In the coding device 41, any component structure similar to that of the coding device 1 is provided with the same reference numeral, and not described again if it is already described.

Similarly to the motion prediction/compensation device 6, in P and B pictures, the motion prediction/compensation device 43 uses a plurality of prediction frames to detect a motion vector for every macroblock and sub-block. The prediction frames are those defined by levels and profiles of the coding process using reference image information stored in the frame memory 16. The detection results are then searched for a motion vector of a reference frame showing the smallest prediction residual. Using the reference frame detected as such, the reference image information stored in the frame memory 16 is subjected to motion compensation so that so-called inter prediction is executed. If with inter coding by such inter prediction, the pixel value as a result of motion compensation is forwarded to the subtracter 4 as a prediction value, and a notification is made to the reverse coding device 10 about the reference frame, and the motion vector for transmission together with the coded data D4.

The motion prediction/compensation device 43 notifies a prediction residual mb me residual of each of the macroblocks relating to the motion compensation to the rate control device 42.

Figure 1:
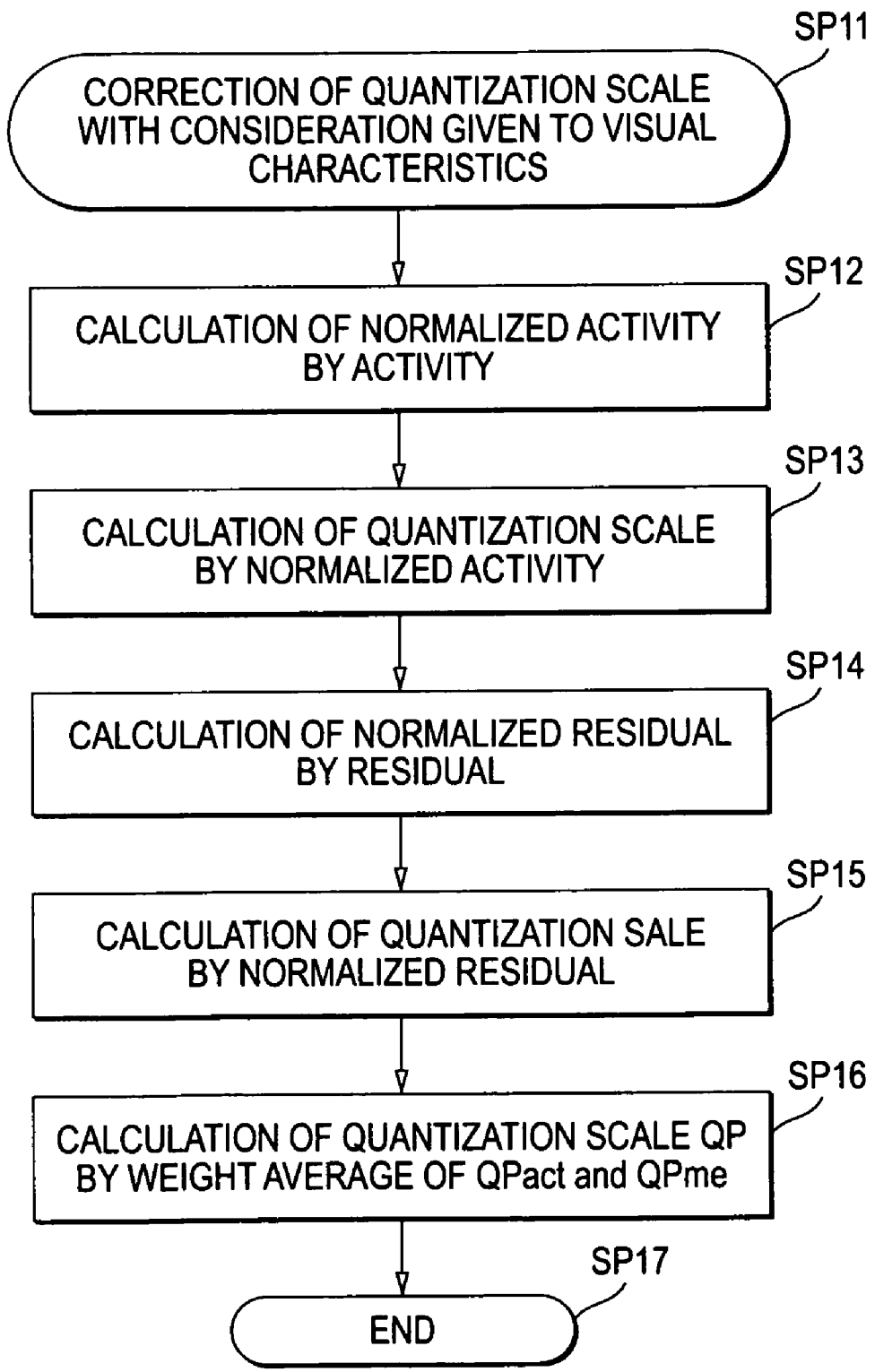
FIG. 1 is a flowchart for use of describing rate control in a coding device in a first embodiment of the invention.
Figure 18:
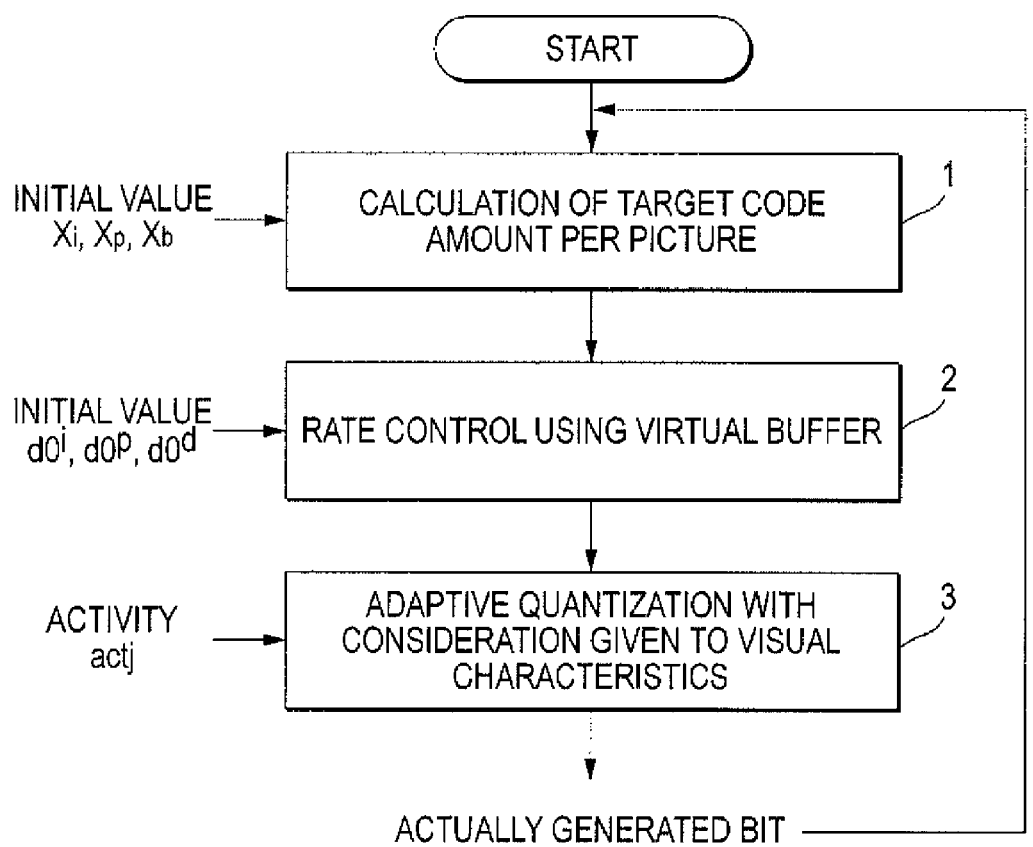
FIG. 18 is a flowchart for use of describing rate control with TM5.

Similarly to the rate control device 9, the rate control device 42 exercises control over a quantization scale of the quantization device 8. In this series of processes, the rate control device 42 makes a setting of a quantization scale to each of the macroblocks by the processes of steps 1 and 2 with TM5 described by referring to FIG. 18, and then the process procedure of FIG. 1 is executed for every macroblock. In this manner, the quantization scale Qj derived in step 2 for each of the macroblocks is corrected with consideration given to the visual characteristics so that the image quality can be improved to a further degree compared with the previous technique with consideration given to the visual characteristics.

That is, when this process procedure is started, the procedure goes from step SP11 to SP12, and the rate control device 42 sequentially executes the computation of the following Equation 31 using the activity mb act detected for each of the macroblocks of a target picture. As such, the rate control device 42 calculates an average value avg mb act of the activities mb act. Using thus calculated average value avg mb act and the activity mb act of the target macroblock, the motion prediction/compensation device 43 then calculates a normalized activity Nactj that takes a value in the range from 0.5 to 2, depending on the activity mb act of the target macroblocks. Note here that, as an alternative to the average value avg mb act, an average value of the activities actj in the precedingly-coded pictures will do.

$$\text{avg\_mb\_act} = \frac{\sum_{n=1}^{MBnum} \text{mb\_act}_n}{MBnum} \quad (31)$$

$$Nact_i = \frac{2 \times \text{mb\_act}_i + \text{avg\_mb\_act}}{\text{mb\_act}_i + 2 \times \text{abg\_mb\_act}}$$

$$QPact_i = (int)(6 \times \log_2(Nact_i \times Q_j))$$

In the following step SP13, using the normalized activity Nactj, the quantization scale Qj set by the process of step 2 is corrected, and a quantization scale Qact by the normalized activity Nactj is calculated. Note that, in Equation 31, the character int denotes a function of returning a maximum integer not exceeding the value in the parentheses.

In the following step S14, the rate control device 42 executes the computation of the following Equation 32 using the prediction residual mb me residual notified by the motion prediction/compensation device 43, thereby calculating an average value avg mb me residual of the prediction residuals in target pictures. Using the average value avg mb me residual of the prediction residuals and the prediction residual mb me residual of the target macroblocks, calculated is the normalized prediction residual Nmb that takes a value in the range from 0.5 to 2 corresponding to the normalized activity Nactj. Note here that, as an alternative to the average value avg mb me residual, an average value of the prediction residual mb me residual in the precedingly-coded pictures will do.

$$\text{avg\_mb\_me\_residue} = \frac{\sum_{n=1}^{MBnum} \text{mb\_me\_residue}_n}{MBnum} \quad (32)$$

$$\text{Nmb\_residue}_i = \frac{2 \times \text{mb\_me\_residue}_i + \text{avg\_mb\_me\_residue}}{\text{mb\_me\_residue}_i + 2 \times \text{avg\_mb\_me\_residue}}$$

$$QPme_i = (int)(6 \times \log_2(\text{Nmb\_residue}_i \times Q_j))$$

In the following step SP15, the quantization scale Qj set in the process of step 2 is corrected using the normalized prediction residual Nmb, and a quantization scale Qme of the normalized prediction residual Nmb is calculated.

As such, after calculating the quantization scales Qact and Qme using the activity and the prediction residual, the rate control device 42 executes the computation of the following Equation 33 in the following step SP16 using the resulting quantization scales Qact and Qme. Thereafter, using weight coefficients α and β, the coefficients Qact and Qme are weighted and averaged so that the quantization scale QP relating to the quantization of the macroblock is calculated. The procedure then goes to step SP17, and this is the end of the process procedure.

$$QP_i = \frac{\alpha \times QPact_i + \beta \times QPme_i}{\alpha + \beta} \quad (33)$$

The coefficients α and β are not necessarily fixed in value, and may each take any arbitrary value. If this is the case, the values may be adaptively changed based on the bit rate of the coded data D4 to be output, e.g., if with a high bit rate, the value of α may be set larger, and if with a low bit rate, the value of β may be set larger. By adaptively changing the coefficients relating to the weight average as such, the correction amount of the quantization scale can be variously changed based on the image quality or others so that the image quality can be improved to a further degree with consideration given to the visual characteristics.

At the time of detecting a motion vector, the motion prediction/compensation device 43 decimates the input image data D1, and the image data relating to the reference image so that a size-reduced image is generated. After detecting a motion vector using the size-reduced image, this detection result is used to restrict a vector detection range so that the eventual motion vector is detected. After the detection, a size-reduction filter 44 performs decimation to the image data of the reference images stored in the frame memory 16. In this manner, the coding device 41 reduces the computation amount for use for detection of the motion vector.

In this case, when a plurality of potential reference images are searched for a reference image using the multiple reference frames described by referring to FIG. 13 to generate a prediction value, as shown in the following Equation 34, the prediction residuals SAD(Ref(k)) in the size-reduced images of the reference frames Ref(k) (k=0, . . . , n) are used to detect a minimum value so that the total residual SAD is derived. As an alternative to the prediction residual mb me residual in Equation 31, this residual SAD may be used to calculate the quantization scale QP.

$$SAD = \underset{k}{\text{argmin}}\, SAD(Ref(k)) \quad (34)$$

With intra prediction, a prediction residual is calculated in a similar manner to the above-described inter prediction. With intra prediction, as an alternative to the above-described prediction residual with inter prediction, the prediction residual for the intra prediction may be similarly used to correct a quantization scale. With this being the case, with intra prediction, the quantization scale can be corrected more appropriately than those by the previous technique so that the image quality can be improved in the sense of sight.

2. Operation

With such a configuration, in the coding device 41 (FIG. 1), an analog video signal S1 is converted to image data D1 by the A/D 2, and then the image sorting buffer 3 applies frame sorting based on the GOP structure relating to a coding process. The sorting result is forwarded to the intra prediction device 5 and the motion prediction/compensation device 6, and from a plurality of intra and inter prediction modes, any optimum prediction mode is selected based on each of the pictures. A prediction value for the selected prediction mode is substrated from the image data D1 in the subtracter 4 so that the differential data D2 is generated. The image data D1 is thus reduced in data amount by utilizing the correlation between any adjacent frames in the horizontal and vertical directions. The differential data D2 is then subjected to orthogonal transform, quantization, and variable-length coding so that the data amount is reduced to a further degree. The coded data D4 is thus generated. As such, the video signal S1 is subjected to the coding process by intra and inter coding, and the result is recorded on a recording medium, for example.

In such processes, under the rate control with the technique of TM5, the coded data D4 is subjected to the process of step 1 with TM5. In the process, the code amount for allocation to a GOP and the generated code amount are used to calculate, sequentially, a target code amount to any not-yet-processed picture in the GOP. With the process of step 2, the target code amount to each of the pictures calculated in step 1 is used to calculate another target code amount for allocation to each of the macroblocks. The resulting target code amounts are used as a basis to set the quantization scale of the quantization device 8, thereby the coded data D4 is put under the rate control.

With the previous rate control with TM5, an activity is detected for each of the macroblocks to show the smoothness of the brightness data. By the process of step 3 using the resulting activities, the quantization scale set to the quantization device 8 is corrected using the quantization scale being the calculation result in step 2. This enables a setting of quantization scale with an aim of improving the image quality with consideration given to the visual characteristics, and the coded data D4 is generated.

With intra prediction, the activity indicating the smoothness of the bright signal indeed serves well to improve the image quality with the visual characteristics. With inter prediction, however, there remains a problem in terms of practical use. As a result, if any pattern-complicated portion where quality deterioration is hardly noticed is not in motion, the image deterioration becomes conspicuous, thereby resulting in the quality deterioration easily perceived in any letter portions such as captions.

In consideration thereof, with the coding device 41, based on such an activity and a prediction residual with inter prediction, the quantization scale which is being the calculation result in step 2 is corrected with an aim to improve the image quality using the visual characteristics. With such a correction, even if any pattern-complicated portion where quality deterioration is hardly noticed is not in motion, the quantization scale can be corrected utilizing the prediction residual. Accordingly, the motion information about the prediction residual is used to detect any image-deteriorated portion, which is not easily found by an activity of information about an original image, thereby allowing to correct the quantization scale so as not to deteriorate the image quality. This improves the image quality to a further degree compared with those previous techniques with consideration given to the visual characteristics.

Specifically, with the coding device 41, an activity is normalized, and a normalized activity is calculated. Using thus calculated normalized activity, a quantization scale is corrected. Moreover, a prediction residual is normalized for use to calculate a normalized prediction residual. Using the normalized prediction residual, a quantization scale is corrected. Combining these two quantization scales leads to a quantization scale calculated with consideration given to the visual characteristics. This accordingly allows to improve the image quality to a further degree compared with the previous technique with consideration given to the visual characteristics so that the quantization scale can be corrected easily with reliability.

3. Effects

With such a configuration, based on an activity and a prediction residual, by correcting the quantization scale set to each of the macroblocks with an aim of improving the image quality utilizing the visual characteristics, the image quality can be improved to a further degree compared with the previous technique with consideration given to the visual characteristics. Using a normalized activity being a result of normalizing an activity, a quantization scale is corrected, and using a normalized prediction residual which is a result of normalizing a prediction residual, another quantization scale is corrected. The resulting two quantization scales are combined together, and the combination result is a quantization scale calculated with consideration given to the visual characteristics. This accordingly allows to improve the image quality to a further degree compared with the previous technique with consideration given to the visual characteristics so that the quantization scale can be corrected easily with reliability.

If such a process of combining the quantization scales is executed by weight average thereof, the quantization scale can be calculated much easily with reliability.

Further, by adaptively changing weight coefficients relating to the process of weight average, the quantization scale can be variously changed and processed depending on the image quality or others so that the image quality can be improved in the sense of sight.

Still further, after roughly detecting a motion vector using a size-reduced image in which the input image data is reduced in resolution, another motion vector is detected with a motion vector detection range restricted based on the detection result. This accordingly simplifies the motion vector detection process relating to inter prediction.

If the motion vector detection process is simplified as such, a minimum value is detected from the prediction residuals by the motion vector detected by the size-reduced image of each of the reference images, and a prediction residual is detected with inter prediction. Such a motion vector detection process can be effectively utilized so that the prediction residual detection process can be simplified for inter prediction.

Still further, a prediction residual is calculated for intra prediction, and with the coding process with intra prediction, as an alternative to the prediction residual with inter prediction, a prediction residual relating to intra prediction is used to correct a quantization scale so that the image quality can be improved to a further degree with consideration given to the visual characteristics.

Second Embodiment

Figure 3:
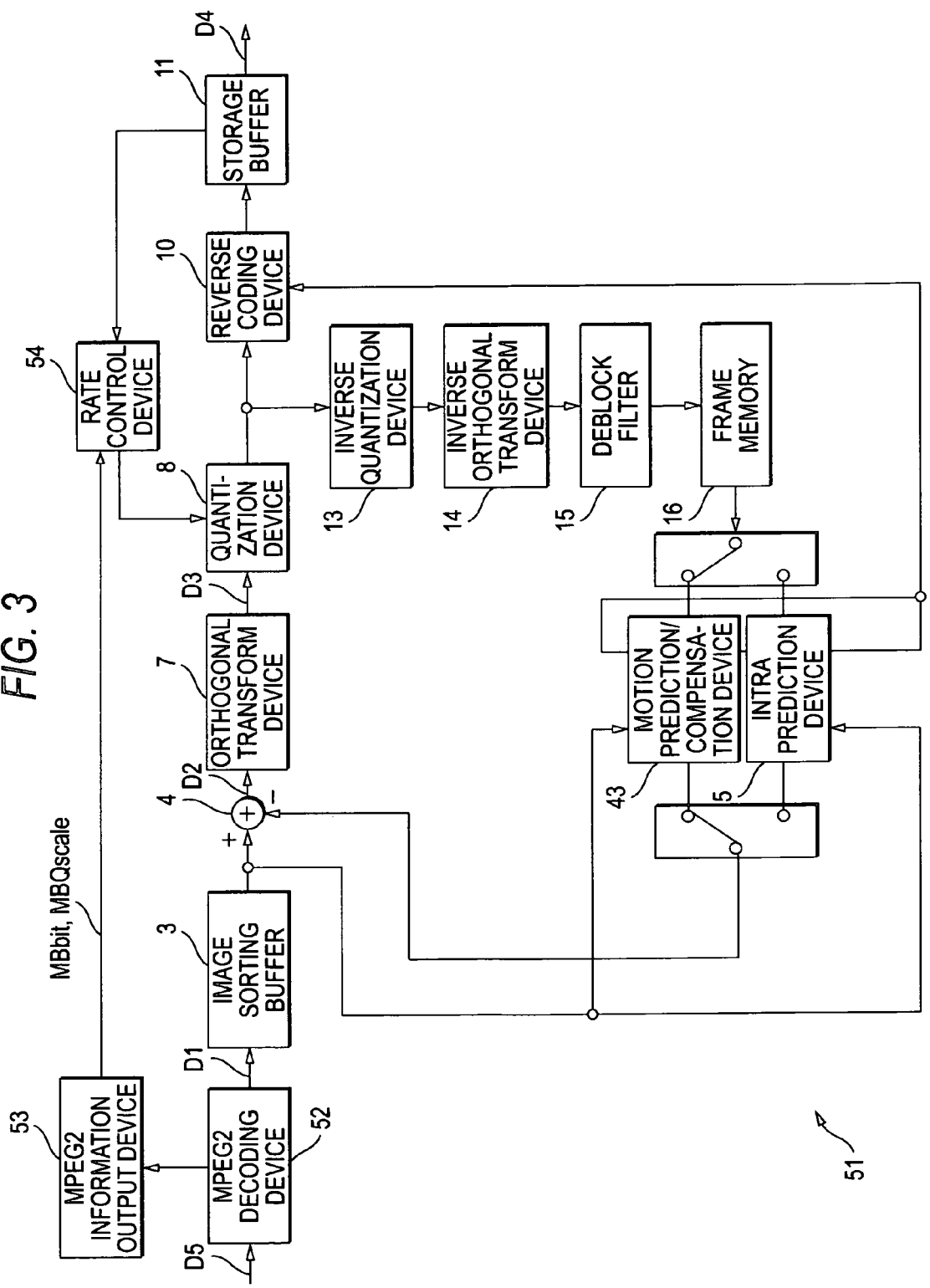
FIG. 3 is a block diagram showing a coding device in a second embodiment of the invention.

FIG. 3 is a block diagram showing a coding device in a second embodiment of the invention. This coding device 51 is provided with an MPEG2 decoding device 52 and an MPEG2 information output device 53 additionally to the configuration of the coding device 41 described above by referring to FIG. 2. This coding device 51 is configured similarly to the coding device 41 described above by referring to FIG. 2 except the MPEG2 decoding device 52 and the MPEG2 information output device 53. Therefore, any component structure similar to that of the coding device 41 is provided with the same reference numeral, and not described again if it is already described.

Here, the MPEG2 decoding device 52 receives and decodes MPEG2 coded data D5, and outputs the image data D1. In response to a user-set operation mode, the coding device 51 then converts the MPEG2 coded data D5 into the AVC coded data D4, and output the conversion result.

The MPEG2 information output device 53 detects the code amount MBbit for each of the macroblocks, and a quantization scale MBQscale for each of the macroblocks from information needed for various decoding processes set to the MPEG2 decoded data D5. The detection results are then notified to a rate control device 54.

To apply a coding process to the input image data D1 provided by devices other than the MPEG2 decoding device 52, the rate control device 54 exercises control over a quantization scale of the quantization device 8 similarly to the rate control device 42 of the coding device 41 described above in the first embodiment.

On the other hand, to apply a coding process to the input image data D1 provided by the MPEG2 decoding device 52, by the computation of the following Equation 35, the code amounts MBbit of the macroblocks are sequentially multiplied by the quantization scale MBQscale so that a macroblock complexity mb complexity is calculated. The resulting macroblock complexity mb complexity corresponds to a prediction residual in the MPEG2 coding process. Therefore, as an alternative to the prediction residual in Equation 32, this macrocomplexity mb complexity is used to calculate a normalized macroblock complexity, and calculates a quantization scale QPcomp. In this case, the rate control device 54 calculates a prediction residual by multiplying the code amounts of the macroblocks MBbit and the quantization scale MBQscale.

$$mb\_complexity_i = MBbit_i \times MBQscale_i \quad (35)$$

$$avg\_mb\_complexity = \frac{\sum_{n=1}^{MBnum} mb\_complexity_n}{MBnum}$$

$$Nmb\_complexity = \frac{2 \times mb\_complexity + avg\_mb\_complexity}{mb\_complexity + 2 \times avg\_mb\_complexity}$$

$$QPcomp_i = (int)(6 \times \log_2(Nmb\_complexity \times Q_j))$$

As shown in the following Equation 36, calculated thereafter is a quantization scale by weight average of thus calculated quantization scale QPcomp and the quantization scale by an activity.

$$QP_i = \frac{\alpha \times QPact_i + \beta \times QPcomp_i}{\alpha + \beta} \quad (36)$$

According to this embodiment, when the input image data is the one generated by decoding the input coding data, a prediction residual is detected, for processing, from the code amount and the quantization scale in the input coding data so that the configuration of detecting a prediction residual can be simplified and the effects similar to the first embodiment can be derived.

Third Embodiment

Exemplified in the above embodiments is the case of correcting the quantization scale derived by the process of step 2 based on an activity and a prediction residual, and weighing and averaging the resulting two quantization scales. This is surely not restrictive, and alternatively, a correction value may be calculated for use to correct the quantization scale derived by the process of step 2 based on an activity and a prediction residual, and then the resulting correction value is weighed and averaged so that an eventual correction value is calculated. Using the eventual correction value, the quantization scale derived by the process of step 2 may be corrected.

Exemplified in the above embodiments is the case of configuring the invention by hardware. This is not the only option, and the invention may be implemented by a software processing. With this being the case, a software program may be installed in advance to the coding device, or may be downloaded over a network such as the Internet. Still alternatively, the software program may be provided via various types of recording medium, e.g., optical disk, magnetic disk, or memory card.

Exemplified in the above embodiments is the case of coding the input image data with the AVC. This is not surely restrictive, and the invention is widely applicable to the case of coding the data with similar formats, e.g., MPEG-4 or H.263.

The invention is applicable to the case of transmitting and recording image data after data compression by orthogonal transform and motion compensation.

It should be understood by those skilled in the art that various modifications, combinations, sub-combinations and alterations may occur depending on design requirements and other factors insofar as they are within the scope of the appended claims or the equivalents thereof.

The invention claimed is:

1. A coding device that makes a GOP setting to input image data, and applies a coding process to the input image data on a macroblock basis successively by intra and inter prediction to output coded data, the device comprising:
    an orthogonal transform section configured to apply an orthogonal transform process to prediction error data of the input image data through the intra and inter prediction to generate coefficient data;
    a quantization section configured to apply a quantization process to the coefficient data to generate quantized data;
    a coding section configured to apply the coding process to the quantized data to generate the coded data; and
    a rate control section configured to exercise rate control over the coded data through control over a quantization scale of the quantization section using the coded data, the rate control section including:
        an activity detection section configured to detect an activity indicating a smoothness of the input image data; and
        a prediction residual detection section configured to detect a prediction residual with the inter prediction of the input image data;
    the rate control section calculating:
        in pictures configuring a GOP, a target code amount of any picture that has not yet been subjected to the coding process, and
        another target code amount for a macroblock of any of the pictures relating to the coding process from the target code amount of the picture not yet subjected to the coding process, and the quantization scale of the quantization section in which a generated code amount serves as the target code amount; and
    the rate control section correcting the calculated quantization scale based on the activity and the prediction residual for improving image quality, wherein the correcting includes:
    normalizing the activity detected in the activity detection section, and calculating a normalized activity;
    correcting the calculated quantization scale using the normalized activity, and calculating a first corrected quantization scale as a result of the correction using the normalized activity;
    normalizing the detected prediction residual, and calculating a normalized prediction residual;
    correcting the calculated quantization scale using the normalized prediction residual, and calculating a second corrected quantization scale as a result of the correction using the normalized prediction residual; and
    combining the first, corrected quantization scale and the second corrected quantization scale.

2. A coding method of making a GOP setting to input image data, and applying a coding process to the input image data on a macroblock basis successively by intra and inter prediction to output coded data, the method comprising:
    applying an orthogonal transform process to prediction error data of the input image data through the intra and inter prediction to generate coefficient data;
    applying a quantization process to the coefficient data to generate quantized data;
    applying the coding process to the quantized data to generate the coded data; and
    exercising rate control over the coded data through control over a quantization scale in the quantization process using the coded data, the step of exercising rate control including:

detecting an activity indicating a smoothness of the input image data;

detecting a prediction residual by the inter prediction of the input image data;

calculating, in pictures configuring a GOP, a target code amount of any picture that has not yet been subjected to the coding process;

calculating another target code amount for a macroblock of any of the pictures relating to the coding process from the target code amount of the picture not yet subjected to the coding process, and the quantization scale of the quantization process in which a generated code amount serves as the target code amount; and correcting the calculated quantization scale based on the activity and the prediction residual, wherein the correcting step includes:

normalizing the activity detected in the activity detection step, and calculating a normalized activity;

correcting the calculated quantization scale using the normalized activity, and calculating a first corrected quantization scale as a result of the correction using the normalized activity;

normalizing the detected prediction residual, and calculating a normalized prediction residual;

correcting the calculated quantization scale using the normalized prediction residual, and calculating a second corrected quantization scale as a result of the correction using the normalized prediction residual; and combining the first corrected quantization scale and the second corrected quantization scale.

3. The coding method according to claim 2, wherein the combining step includes:

calculating the quantization scale by a weight average of the first corrected quantization scale and the second corrected quantization scale.

4. The coding method according to claim 3, wherein the combining step includes:

adaptively changing a weight coefficient relating to the weight average.

5. The coding method according to claim 2, further comprising:

roughly detecting a motion vector using a size-reduced image in which the input image data is reduced in resolution, and, based on a detection result, detecting another motion vector relating to the inter prediction by detecting the motion vector with a motion vector detection range restricted.

6. The coding method according to claim 5, wherein the prediction error data as a result of the intra prediction is generated through selection of an optimum reference image from a plurality of reference images, and the step of detecting the prediction residual includes detecting the prediction residual with the inter prediction through detection of a minimum value from the prediction residual using the motion vector detected by the size-reduced image of each of the reference images.

7. The coding method according to claim 2, further comprising:

calculating the prediction residual with the intra prediction.

8. The coding method according to claim 2, wherein the input image data is generated by decoding input coding data, and the step of detecting the prediction residual includes detecting the prediction residual from the code amount and the quantization scale in the input coding data.

9. A recording medium recorded with a program for executing a coding method of making a GOP setting to input image data, and applying a coding process to the input image data on a macroblock basis successively by intra and inter prediction to output coded data, the coding method comprising:

applying an orthogonal transform process to prediction error data of the input image data through the intra and inter prediction to generate coefficient data;

applying a quantization process to the coefficient data to generate quantized data;

applying the coding process to the quantized data to generate the coded data; and exercising rate control over the coded data through control over a quantization scale in the quantization process using the coded data, the step of exercising rate control including:

detecting an activity indicating a smoothness of the input image data;

detecting a prediction residual by the inter prediction of the input image data;

calculating, in pictures configuring a GOP, a target code amount of any picture that has not yet been subjected to the coding process;

calculating another target code amount for a macroblock of any of the pictures relating to the coding process from the target code amount of the picture not yet subjected to the coding process, and the quantization scale of the quantization process in which a generated code amount serves as the target code amount; and correcting the calculated quantization scale based on the activity and the prediction residual, wherein the correcting step includes:

normalizing the activity detected in the activity detection step, and calculating a normalized activity;

correcting the calculated quantization scale using the normalized activity, and calculating a first corrected quantization scale as a result of the correction using the normalized activity;

normalizing the detected prediction residual, and calculating a normalized prediction residual;

correcting the calculated quantization scale using the normalized prediction residual, and calculating a second corrected quantization scale as a result of the correction using the normalized prediction residual; and combining the first corrected quantization scale and the second corrected quantization scale.

* * * * *